United States Patent
Namba et al.

(10) Patent No.: US 10,910,617 B2
(45) Date of Patent: Feb. 2, 2021

(54) NONAQUEOUS ELECTROLYTE SECONDARY BATTERY

(71) Applicants: KABUSHIKI KAISHA TOSHIBA, Minato-ku (JP); Toshiba Infrastructure Systems & Solutions Corporation, Kawasaki (JP)

(72) Inventors: Kazuhiro Namba, Kashiwazaki (JP); Dai Yamamoto, Kashiwazaki (JP); Akira Yajima, Kashiwazaki (JP)

(73) Assignees: KABUSHIKI KAISHA TOSHIBA, Minato-ku (JP); Toshiba Infrastructure Systems & Solutions Corporation, Kawasaki (JP)

( * ) Notice: Subject to any disclaimer, the term of this patent is extended or adjusted under 35 U.S.C. 154(b) by 106 days.

(21) Appl. No.: 16/387,592

(22) Filed: Apr. 18, 2019

(65) Prior Publication Data

US 2019/0245173 A1 Aug. 8, 2019

Related U.S. Application Data

(63) Continuation of application No. PCT/JP2017/041536, filed on Nov. 17, 2017.

(30) Foreign Application Priority Data

Nov. 18, 2016 (JP) ................. 2016-225080

(51) Int. Cl.
*H01M 2/12* (2006.01)
*H01M 4/505* (2010.01)
(Continued)

(52) U.S. Cl.
CPC ............... *H01M 2/12* (2013.01); *H01M 2/02* (2013.01); *H01M 2/30* (2013.01); *H01M 4/13* (2013.01);
(Continued)

(58) Field of Classification Search
CPC .................................................. H01M 4/505
See application file for complete search history.

(56) References Cited

U.S. PATENT DOCUMENTS

| 2009/0061292 A1 | 3/2009 | Inagaki et al. |
| 2012/0214069 A1* | 8/2012 | Goto ................... H01M 4/1391 429/231.2 |

(Continued)

FOREIGN PATENT DOCUMENTS

| JP | 2000-100399 | 4/2000 |
| JP | 2008-59980 | 3/2008 |

(Continued)

OTHER PUBLICATIONS

International Search Report dated Jan. 9, 2018 in PCT/JP2017/041536, filed on Nov. 17, 2017 (with English Translation).

(Continued)

*Primary Examiner* — Ula C Ruddock
*Assistant Examiner* — Armindo Carvalho, Jr.
(74) *Attorney, Agent, or Firm* — Oblon, McClelland, Maier & Neustadt, L.L.P.

(57) ABSTRACT

According to one embodiment, a nonaqueous electrolyte secondary battery is provided. The nonaqueous electrolyte secondary battery includes a container member, a negative electrode, a positive electrode, and a nonaqueous electrolyte. The container member is provided with a gas relief structure. The negative electrode includes a negative electrode mixture layer. The negative electrode mixture layer contains a titanium-containing oxide and Mn. Abundance ratios $R_{Ti}$, $R_{Mn}$, $R_A$ and $R_B$ obtained according to an X-ray photoelectron spectroscopy spectrum of the negative electrode mixture layer satisfy the following relational expressions:

$$0.01 \leq R_{Mn}/R_{Ti} \leq 0.2 \tag{1}$$

$$3 \leq R_A/R_{Mn} \leq 50 \tag{2}$$

and $$0.5 \leq R_A/R_B \leq 5 \tag{3}$$

6 Claims, 4 Drawing Sheets

(51) Int. Cl.
*H01M 4/36* (2006.01)
*H01M 2/30* (2006.01)
*H01M 10/0569* (2010.01)
*H01M 4/131* (2010.01)
*H01M 2/02* (2006.01)
*H01M 10/052* (2010.01)
*H01M 4/62* (2006.01)
*H01M 4/48* (2010.01)
*H01M 4/485* (2010.01)
*H01M 4/13* (2010.01)
*H01M 4/02* (2006.01)

(52) U.S. Cl.
CPC .......... *H01M 4/131* (2013.01); *H01M 4/364* (2013.01); *H01M 4/366* (2013.01); *H01M 4/48* (2013.01); *H01M 4/485* (2013.01); *H01M 4/505* (2013.01); *H01M 4/62* (2013.01); *H01M 10/052* (2013.01); *H01M 10/0569* (2013.01); *H01M 2004/021* (2013.01); *H01M 2004/027* (2013.01); *Y02E 60/10* (2013.01)

(56) References Cited

U.S. PATENT DOCUMENTS

2014/0272487 A1  9/2014  Ishii et al.
2016/0036039 A1  2/2016  Kuriyama et al.

FOREIGN PATENT DOCUMENTS

| | | |
|---|---|---|
| JP | 2009-54475 | 3/2009 |
| JP | 5050452 | 10/2012 |
| JP | 5184846 | 4/2013 |
| JP | 2014-167873 | 9/2014 |
| JP | 2014-179195 | 9/2014 |
| JP | 2016-35902 | 3/2016 |

OTHER PUBLICATIONS

Written Opinion dated Jan. 9, 2018 in PCT/JP2017/041536, filed on Nov. 17, 2017.

\* cited by examiner

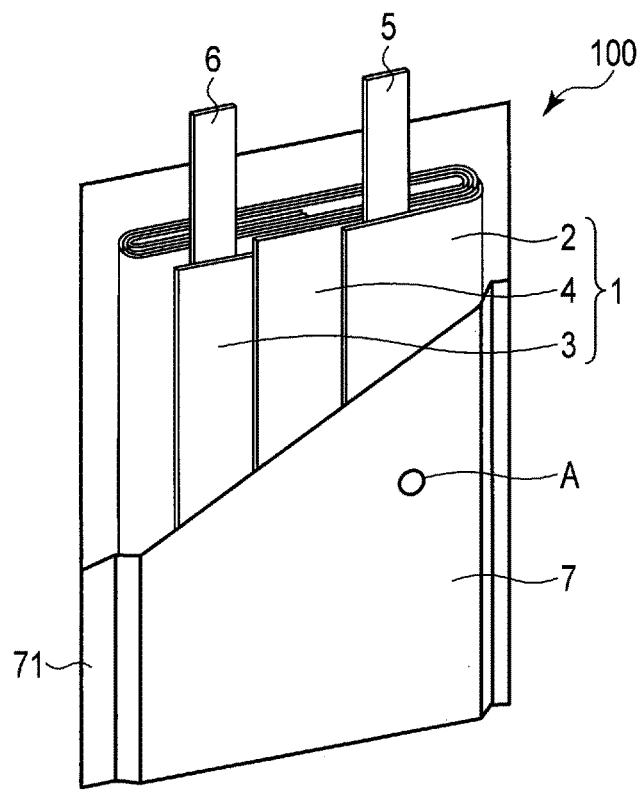
F I G. 1
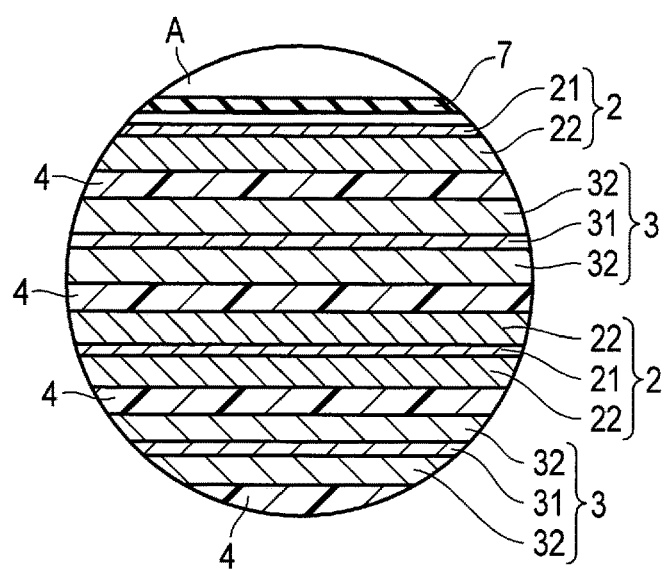
F I G. 2

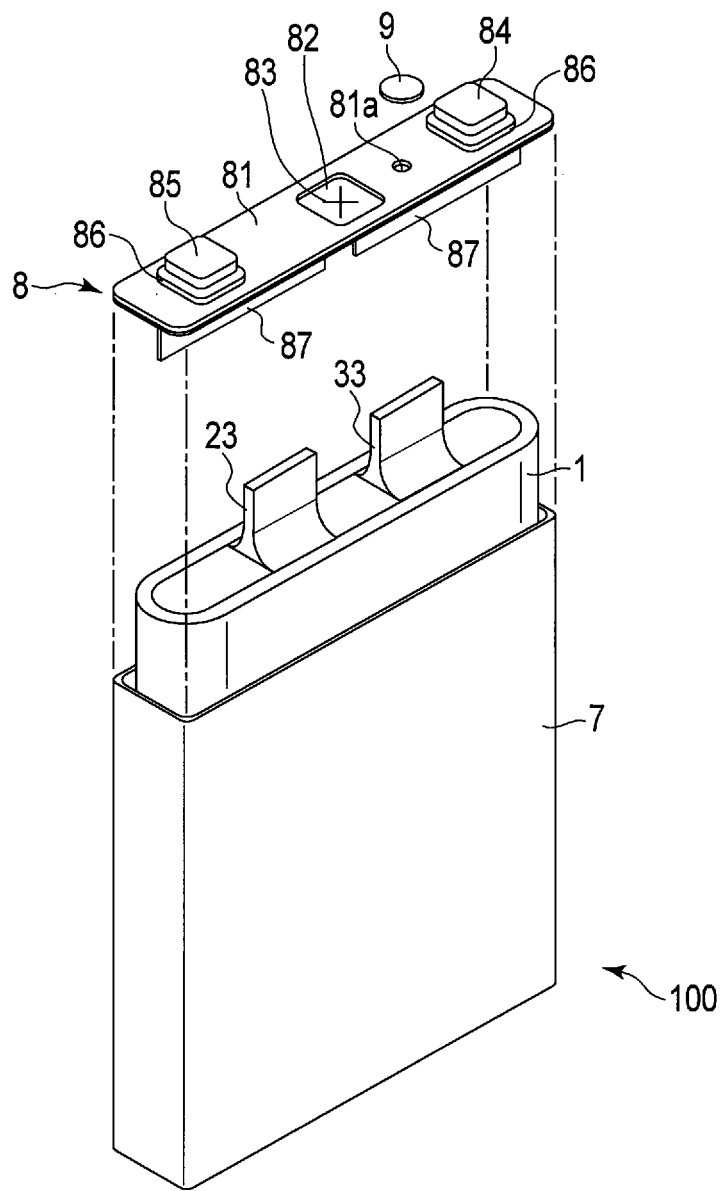
F I G. 3

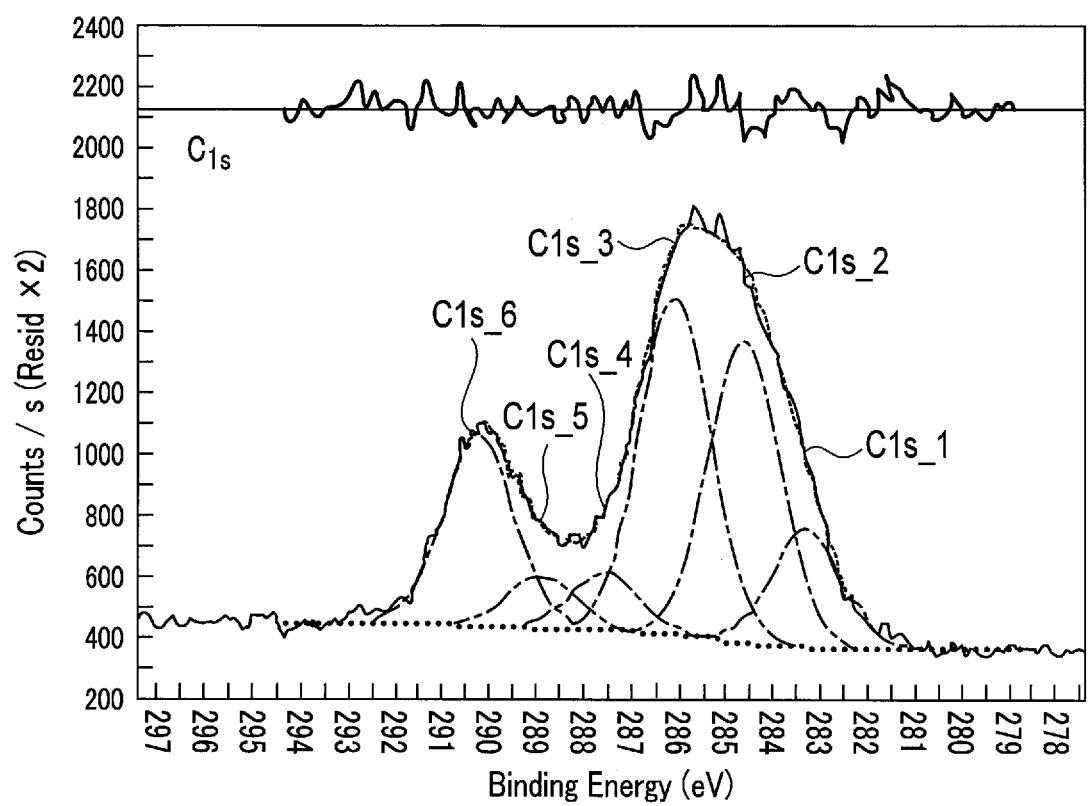
F I G. 6

NONAQUEOUS ELECTROLYTE SECONDARY BATTERY

CROSS-REFERENCE TO RELATED APPLICATIONS

This application is a Continuation Application of PCT Application No. PCT/JP2017/041536, filed Nov. 17, 2017, and based upon and claiming the benefit of priority from Japanese Patent Application No. 2016-225080, filed Nov. 18, 2016, the entire contents of all of which are incorporated herein by reference.

FIELD

Embodiments described herein relate to a nonaqueous electrolyte secondary battery.

BACKGROUND

It is known that a nonaqueous electrolyte secondary battery using spinel-type lithium titanate in a negative electrode has low resistance and exhibits excellent input-and-output characteristics.

On the other hand, a nonaqueous electrolyte secondary battery has a risk of rupture, ignition, etc., when overcharged. Therefore, it has been widely tried to improve the safety of the nonaqueous electrolyte secondary battery at the time of overcharging by releasing the gas from the inside of the container member to the outside when the gas pressure inside the container member of the battery becomes high.

Heretofore, several techniques have been reported in which the presence of a metal compound different from the active material in the negative electrode containing the spinel-type lithium titanate offers improved life characteristics of the nonaqueous electrolyte secondary battery. However, these techniques are not directed to improvement in the safety of the nonaqueous electrolyte secondary battery.

BRIEF DESCRIPTION OF THE DRAWINGS

FIG. 1 is a partially cutaway perspective view of a nonaqueous electrolyte secondary battery according to a first example of an embodiment;

FIG. 2 is an enlarged sectional view of portion A of the nonaqueous electrolyte secondary battery shown in FIG. 1;

FIG. 3 is an exploded perspective view of a nonaqueous electrolyte secondary battery according to a second example of the embodiment;

FIG. 6 is an XPS spectrum of the negative electrode mixture layer of the nonaqueous electrolyte secondary battery according to the example of the embodiment.

DETAILED DESCRIPTION

Figure 4:
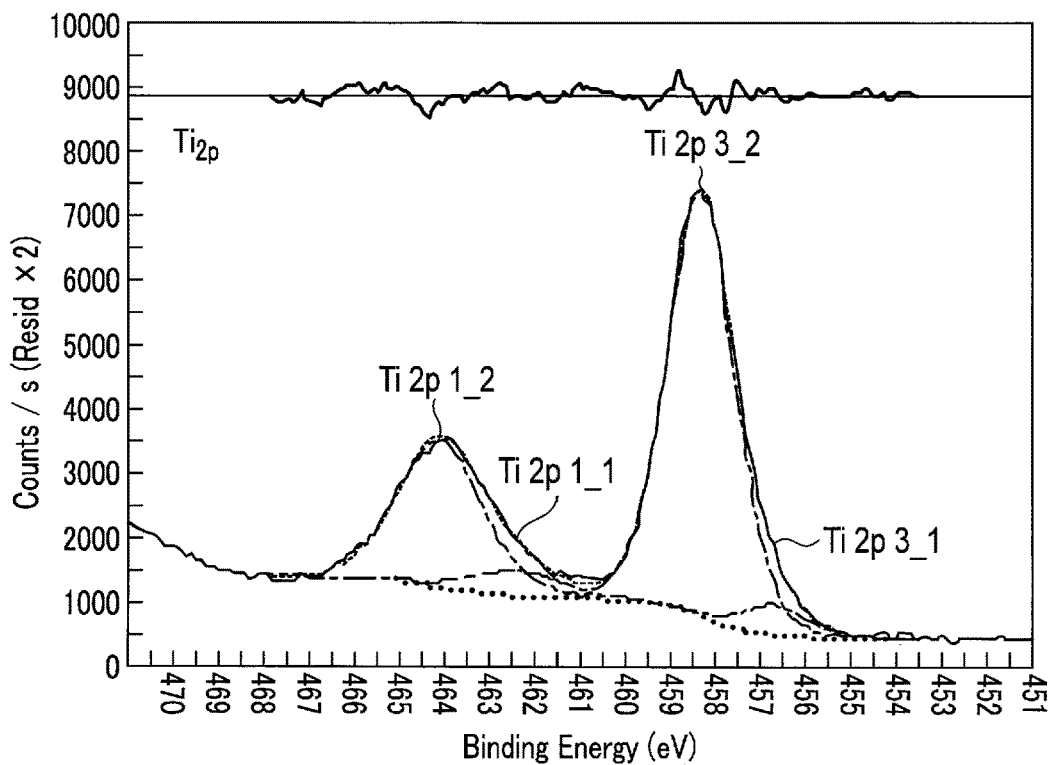
FIG. 4 is an XPS spectrum of a negative electrode mixture layer of a nonaqueous electrolyte secondary battery according to an example of the embodiment.

According to an embodiment, a nonaqueous electrolyte secondary battery is provided. The nonaqueous electrolyte secondary battery includes a container member, a negative electrode, a positive electrode, and a nonaqueous electrolyte. The container member is provided with a gas relief structure. The container member accommodates the negative electrode, the positive electrode, and the nonaqueous electrolyte. The negative electrode includes a negative electrode mixture layer. The negative electrode mixture layer contains a titanium-containing oxide and Mn. An X-ray photoelectron spectroscopy spectrum obtained by X-ray photoelectron spectroscopy measurement of the negative electrode mixture layer includes: a peak belonging to Ti; a peak belonging to Mn; a peak belonging to C constituting a $CO_3$ moiety; and a peak belonging to C constituting a $CO_2$ moiety and/or a peak belonging to C constituting a CO moiety. Abundance ratios $R_{Ti}$, $R_{Mn}$, $R_A$ and $R_B$ obtained from the X-ray photoelectron spectroscopy spectrum satisfy the following relational expressions:

$$0.01 \leq R_{Mn}/R_{Ti} \leq 0.2 \quad (1);$$

$$3 \leq R_A/R_{Mn} \leq 50 \quad (2); \text{ and}$$

$$0.5 \leq R_A/R_B \leq 5 \quad (3).$$

Where $R_{Ti}$ is an abundance ratio of Ti. $R_{Mn}$ is an abundance ratio of Mn. $R_A$ is an abundance ratio of C constituting the CO moiety. $R_B$ is a sum of an abundance ratio $R_C$ of C constituting the CO moiety and an abundance ratio $R_D$ of C constituting the $CO_2$ moiety.

The embodiments will be explained below with reference to the drawings. In this case, the structures common to all embodiments are represented by the same symbols and duplicated explanations will be omitted. Also, each drawing is a typical view for explaining the embodiments and for promoting an understanding of the embodiments. Though there are parts different from an actual device in shape, dimension and ratio, the structural designs may be properly changed taking the following explanations and known technologies in to consideration.

Embodiment

According to an embodiment, a nonaqueous electrolyte secondary battery is provided. The nonaqueous electrolyte secondary battery includes a container member, a negative electrode, a positive electrode, and a nonaqueous electrolyte. The container member is provided with a gas relief structure. The container member accommodates the negative electrode, the positive electrode, and the nonaqueous electrolyte. The negative electrode includes a negative electrode mixture layer. The negative electrode mixture layer contains a titanium-containing oxide and Mn. An X-ray photoelectron spectroscopy spectrum obtained by X-ray photoelectron spectroscopy measurement of the negative electrode mixture layer includes: a peak belonging to Ti; a peak belonging to Mn; a peak belonging to C constituting a $CO_3$ moiety; and a peak belonging to C constituting a $CO_2$ moiety and/or a peak belonging to C constituting a CO moiety. Abundance ratios $R_{Ti}$, $R_{Mn}$, $R_A$ and $R_B$ obtained from the X-ray photoelectron spectroscopy spectrum satisfy the following relational expressions:

$$0.01 \leq R_{Mn}/R_{Ti} \leq 0.2 \quad (1);$$

$$3 \leq R_A/R_{Mn} \leq 50 \quad (2); \text{ and}$$

$$0.5 \leq R_A/R_B \leq 5 \quad (3).$$

Where $R_{Ti}$ is an abundance ratio of Ti. $R_{Mn}$ is an abundance ratio of Mn. $R_A$ is an abundance ratio of C constituting the $CO_3$ moiety. $R_B$ is a sum of an abundance ratio $R_C$ of C constituting the CO moiety and an abundance ratio $R_D$ of C constituting the $CO_2$ moiety.

A nonaqueous electrolyte secondary battery according to the embodiment can raise, while suppressing the increase in the resistance value, the gas pressure inside the battery, that is, in the space surrounded by the container member, in a charged state before the battery reaches a state of charge (SOC) that leads to rupture of the battery. The gas release structure of the container member can release the gas inside the battery to the outside of the battery when the gas pressure inside the battery rises to reach a predetermined pressure, and this can prevent the gas pressure inside the battery from excessively increasing to the extent resulting in the battery rupture. Accordingly, the nonaqueous electrolyte secondary battery according to the embodiment can exhibit a low resistance and can also exhibit excellent safety.

Hereinafter, the reason why the nonaqueous electrolyte secondary battery according to the embodiment can exhibit a low resistance and excellent safety will be described in detail.

The following description will be given by describing a ratio $R_{Mn}/R_{Ti}$ as a ratio x, a ratio $R_A/R_{Mn}$ as a ratio y, and a ratio $R_A/R_B$ as a ratio z.

The X-ray photoelectron spectroscopy spectrum of the negative electrode mixture layer is obtained by subjecting the negative electrode mixture layer to X-ray photoelectron spectroscopy (XPS). It can be said that in the nonaqueous electrolyte secondary battery in which the ratios x, y, and z obtained from the spectrum fall within the above-indicated ranges, the negative electrode mixture layer includes a compound containing Mn and a $CO_3$ moiety, and the amount of the compound is regarded as an amount allowing for generation of gas sufficient to activate the gas relief structure when the state of charge of the nonaqueous electrolyte secondary battery becomes high. Hereinafter, the compound containing Mn and the CO moiety will be referred to as a first compound.

The first compound may include manganese carbonate, for example. The first compound may be formed, for example, as a coating on at least a part of a surface of titanium-containing oxide particles. The first compound may include, for example, an organomanganese compound. For the organomanganese compound, for example, a compound represented by R1-O—(C=O)—O—Mn—O—(C=O)—O—R1' may be included. R1 and R1' described above are hydrocarbon groups. R1 and R1' may be the same or different, and are selected from the group consisting of, for example, a methyl group, an ethyl group, a propyl group, a vinyl group, and an allyl group.

In the nonaqueous electrolyte secondary battery according to the embodiment, when the state of charge of the battery increases, gas is generated from the negative electrode mixture layer. This gas may include, for example, carbon dioxide generated due to pyrolysis of the first compound.

In the nonaqueous electrolyte secondary battery according to the embodiment, since the container member includes the gas relief structure, the gas generated inside the battery can be released to the outside of the container member through the gas relief structure. That is, the nonaqueous electrolyte secondary battery according to the embodiment can release the gas inside the battery to the outside before reaching the state of charge that leads to rupture. As a result, the nonaqueous electrolyte secondary battery according to the embodiment can be prevented from reaching the state of charge that may cause rupture and ignition, and can exhibit excellent safety.

In addition, in the nonaqueous electrolyte secondary battery in which the ratios x, y and z obtained according to the X-ray photoelectron spectroscopy spectrum for the negative electrode mixture layer fall within the above-described ranges, it is possible to suppress the increase in the resistance of the negative electrode due to the presence of the first compound. As a result, the nonaqueous electrolyte secondary battery according to the embodiment can exhibit excellent safety as described above while exhibiting low resistance.

The ratio x is $R_{Mn}/R_{Ti}$. Here, $R_{Mn}$ is the abundance ratio of Mn, and $R_{Ti}$ is the abundance ratio of Ti. The negative electrode mixture layer of the nonaqueous electrolyte secondary battery according to the embodiment contains a titanium-containing oxide, and thus contains Ti. In addition, the negative electrode mixture layer contains Mn. Therefore, the ratio x can correspond to the ratio of the amount of the first compound containing Mn and the $CO_3$ moiety to the amount of the titanium-containing oxide containing Ti.

In addition, the titanium-containing oxide may be included in the negative electrode mixture layer as a negative electrode active material as will be described below. The state of charge of the nonaqueous electrolyte secondary battery may be related to the state of charge of the negative electrode active material, that is, the titanium-containing oxide. The state of charge of the titanium-containing oxide is related to the amount of the titanium-containing oxide. Therefore, the ratio x may be regarded as corresponding to the ratio of the amount of the first compound to the amount of the titanium-containing oxide related to the state of charge of the nonaqueous electrolyte secondary battery.

In a nonaqueous electrolyte secondary battery in which the value of the ratio x is less than 0.01, the negative electrode mixture layer does not contain a sufficient amount of the first compound with respect to the amount of the titanium-containing oxide. In such a nonaqueous electrolyte secondary battery, the amount of gas generated when the state of charge of the battery becomes high is small. Therefore, such a nonaqueous electrolyte secondary battery cannot sufficiently exhibit the effect of preventing the state of charge leading to rupture.

In the nonaqueous electrolyte secondary battery in which the value of the ratio x is larger than 0.2, the negative electrode mixture layer contains an excessive amount of the first compound with respect to the amount of the titanium-containing oxide. In such a nonaqueous electrolyte secondary battery, the resistance of the negative electrode is high.

The ratio y is $R_A/R_{Mn}$, and the ratio z is $R_A/R_B$. Here, $R_A$ is the abundance ratio of C constituting the $CO_3$ moiety. $R_B$ is the sum of the abundance ratio $R_C$ of C constituting the CO moiety and the abundance ratio $R_D$ of C constituting the $CO_2$ moiety.

C constituting the $CO_3$ moiety is included in the first compound containing Mn and the $CO_3$ moiety. C constituting $CO_3$ may also be included in a second compound containing the $CO_3$ moiety but not Mn, which is different from the first compound. The second compound may be generated by decomposition of the solvent of the nonaqueous electrolyte. The second compound may include, for example, a compound represented by R2-O—(C=O)—O—R2', a compound represented by R2-O—(C=O)—O—Li, or lithium carbonate. R2 and R2' described above are hydrocarbon groups. R2 and R2' may be the same or different, and are selected from the group consisting of, for example, a methyl group, an ethyl group, a propyl group, a vinyl group, and an allyl group.

C constituting the CO moiety may be included in the compound containing the CO moiety. In addition, C constituting the $CO_2$ moiety may be included in a compound containing the $CO_2$ moiety. Hereinafter, a compound containing the CO moiety will be referred to as a third compound, while a compound containing the $CO_2$ moiety will be referred to as a fourth compound. The third compound and the fourth compound may be generated by decomposition of the solvent of the nonaqueous electrolyte. The third compound may include, for example, a compound represented by R3-(C=O)—R3'. R3 and R3' described above are hydrocarbon groups. R3 and R3' may be the same or different. The fourth compound may include, for example, a compound represented by R4-(C=O)—O—R4', or a compound represented by R4-(C=O)—O—Li. R4 and R4' may be the same or different. R3, R3', R4, and R4' are independently selected from the group consisting of, for example, a methyl group, an ethyl group, a propyl group, a vinyl group, and an allyl group.

For example, even if the value of the ratio x falls within the range from 0.01 to 0.2, if the value of the ratio y is less than 3, the amount of the $CO_3$ moiety contained in the negative electrode mixture layer is too small with respect to the amount of Mn. This may indicate that the negative electrode mixture layer does not contain a sufficient amount of the first compound. Such a nonaqueous electrolyte secondary battery cannot generate a sufficient amount of gas to activate the gas release structure when the state of charge becomes high. Therefore, such a nonaqueous electrolyte secondary battery cannot sufficiently exhibit the effect of preventing the state of charge leading to rupture. Alternatively, the fact that the amount of the $CO_3$ moiety contained in the negative electrode mixture layer is too small with respect to the amount of Mn may indicate that the negative electrode mixture layer contains an excessive amount of a compound containing Mn other than the first compound. In such a nonaqueous electrolyte secondary battery, the resistance of the negative electrode is high.

Conversely, the case where the value of the ratio x falls within the range from 0.01 to 0.2 and the value of the ratio y is more than 50 indicates that the negative electrode mixture layer contains an excessive amount of the $CO_3$ moiety with respect to Mn. This case may indicate that the negative electrode mixture layer contains an excessive amount of the second compound containing the $CO_3$ moiety, other than the first compound containing Mn and the $CO_3$ moiety. In such a nonaqueous electrolyte secondary battery, the resistance of the negative electrode is high.

In a battery in which the value of the ratio x falls within the range from 0.01 to 0.2 and the value of the ratio y falls within the range from 3 to 50 while the value of the ratio z is smaller than 0.5, for the reason set forth below, the negative electrode mixture layer does not contain a sufficient amount of the first compound to be able to generate a sufficient amount of gas to activate the gas relief structure when the state of charge becomes high.

First, the ratio z of $R_A/R_B$ is the quotient obtained by dividing the abundance ratio $R_A$ by the sum $R_B$ of the abundance ratios. The abundance ratio $R_A$ is the abundance ratio of C constituting the $CO_3$ moiety contained in the negative electrode mixture layer. The sum $R_B$ of the abundance ratios is the sum of the abundance ratio Re and the abundance ratio $R_D$. The abundance ratio $R_C$ is the abundance ratio of C constituting the CO moiety that may be contained in the negative electrode mixture layer. The abundance ratio $R_D$ is the abundance ratio of C constituting the $CO_2$ moiety that may also be contained in the negative electrode mixture layer.

The $CO_3$ moiety may be contained in, as described above, in addition to the first compound containing Mn and the $CO_3$ moiety, the second compound different from the first compound and generated by decomposition of the solvent of the nonaqueous electrolyte. Moreover, by decomposition of the solvent of the nonaqueous electrolyte, in addition to the second compound containing the $CO_3$ moiety, the third compound containing the CO moiety or the fourth compound containing the $CO_2$ moiety may be generated.

Therefore, the ratio z may be regarded as a ratio of the abundance ratio $R_A$ to the sum $R_B$ of the abundance ratios. Here, the abundance ratio $R_A$ is the sum of the abundance ratio of C constituting the $CO_3$ moiety of the first compound and the abundance ratio of C constituting the $CO_3$ moiety of the second compound generated by decomposition of the solvent of the nonaqueous electrolyte. The sum $R_B$ of the abundance ratios is the sum of the abundance ratios of C constituting the CO moiety of the third compound and/or C constituting the $CO_2$ moiety of the fourth compound generated by decomposition of the solvent of the nonaqueous electrolyte. That is, the smaller the ratio z is, the smaller the amount of the first compound contained in the negative electrode mixture layer is. Specifically, if the value of the ratio x falls within the range from 0.01 to 0.2 and the value of the ratio y falls within the range from 3 to 50 but the value of the ratio z is smaller than 0.5, this includes a case where the first compound is not sufficiently formed while a relatively large amount of compounds generated by decomposition of the solvent of the nonaqueous electrolyte are present in the negative electrode mixture layer. This case includes a case where while a larger amount of second compounds generated by decomposition of the solvent of the nonaqueous electrolyte is present in comparison to the first compound, the absolute amount is small. In this case, it is impossible to generate a sufficient amount of gas when the state of charge of the nonaqueous electrolyte secondary battery becomes high. Therefore, in such a nonaqueous electrolyte secondary battery, the amount of gas to be generated when the state of charge of the battery becomes high is small, and the effect of providing excellent safety cannot be exhibited. Moreover, the case where the ratio z is less than 0.5 includes a case where compounds generated by decomposition of the solvent are excessively formed. In this case, the compound generated by decomposition of the solvent becomes a resistance component, and increases the resistance of the battery.

On the other hand, in the nonaqueous electrolyte secondary battery in which the value of the ratio z exceeds 5, the negative electrode mixture layer contains an excessive amount of the first compound containing Mn and the CO moiety. In such a nonaqueous electrolyte secondary battery, the resistance of the negative electrode becomes too high.

The value of the ratio x is preferably from 0.02 to 0.15, more preferably from 0.02 to 0.1. The value of the ratio y is preferably from 5 to 40, more preferably from 15 to 30. The value of the ratio z is preferably from 1 to 4, more preferably from 1 to 2. That is, the abundance ratios $R_{Ti}$, $R_{Mn}$, $R_A$, and $R_B$ preferably fall within the following ranges: $0.02 \leq R_{Mn}/R_{Ti} \leq 0.15$; $5 \leq R_A/R_{Mn} \leq 40$; and $1 \leq R_A/R_B \leq 4$. The abundance ratios $R_{Ti}$, $R_{Mn}$, $R_A$, and $R_D$ more preferably fall within the following ranges: $0.02 \leq R_{Mn}/R_{Ti} \leq 0.1$; $15 \leq R_A/R_{Mn} \leq 30$; and $1 \leq R_A/R_B \leq 2$.

The negative electrode mixture layer of the negative electrode of the nonaqueous electrolyte secondary battery according to the present embodiment can include the second compound containing the $CO_3$ moiety, the third compound containing the CO moiety, and/or the fourth compound containing the $CO_2$ moiety.

Hereinafter, the nonaqueous electrolyte secondary battery according to the embodiment will be described in more detail.

The nonaqueous electrolyte secondary battery according to the embodiment includes a negative electrode, a positive electrode, a nonaqueous electrolyte, and a container member.

The negative electrode includes a negative electrode mixture layer. The negative electrode may further include a negative electrode current collector. The negative electrode mixture layer may be provided on at least one surface of the negative electrode current collector. That is, the negative electrode mixture layer may be supported by one surface or both surfaces of the negative electrode current collector. Furthermore, the negative electrode current collector may include a portion having a surface not supporting the negative electrode mixture layer. This portion can act as a negative electrode tab. Alternatively, the negative electrode may include a negative electrode tab separate from the negative electrode current collector.

The positive electrode may include a positive electrode current collector, and a positive electrode mixture layer provided on at least one surface of the positive electrode current collector. That is, the positive electrode mixture layer may be supported by one surface or both surfaces of the positive electrode current collector. The positive electrode current collector may include a portion having a surface not supporting the positive electrode mixture layer. This portion can act as a positive electrode tab. Alternatively, the positive electrode may include a positive electrode tab separate from the positive electrode current collector.

The negative electrode and the positive electrode may constitute an electrode group. In the electrode group, the positive electrode mixture layer and the negative electrode mixture layer may face each other via, for example, a separator.

The electrode group may have various structures. For example, the electrode group may have a stack-type structure. The electrode group having a stack-type structure can be obtained by, for example, alternately stacking a plurality of negative electrodes and a plurality of positive electrodes with a separator provided between a negative electrode mixture layer and a positive electrode mixture layer. Alternatively, the electrode group may have a wound-type structure. The wound-type electrode group can be obtained by, for example, stacking one separator, one negative electrode, another separator, and one positive electrode in this order to form a stack, and then winding the stack.

The nonaqueous electrolyte secondary battery according to the embodiment may further include a negative electrode terminal and a positive electrode terminal. A part of the negative electrode terminal is electrically connected to a part of the negative electrode so that the negative electrode terminal can function as a conductor for movement of electrons between the negative electrode and the external terminal. The negative electrode terminal can be connected to, for example, the negative electrode current collector, particularly the negative electrode tab.

Likewise, the positive electrode terminal is electrically connected to a part of the positive electrode so that the positive electrode terminal can function as a conductor for movement of electrons between the positive electrode and the external terminal. The positive electrode terminal can be connected to, for example, the positive electrode current collector, particularly the positive electrode tab.

The container member accommodates the electrode group and the nonaqueous electrolyte. The electrode group may be impregnated with the nonaqueous electrolyte in the container member. A part of each of the negative electrode terminal and the positive electrode terminal may be extended from the container member.

In addition, the container member is provided with a gas relief structure capable of releasing the internal gas to the outside when the internal pressure increases to reach a predetermined pressure. The gas relief structure will be described later.

Hereinafter, more detailed descriptions will be given for the negative electrode, the positive electrode, the nonaqueous electrolyte, the separator, the negative electrode terminal, the positive electrode terminal, and the container member.

(Negative Electrode)

The negative electrode mixture layer included in the negative electrode may include, for example, a negative electrode active material, a conductive agent, a binder, and a negative electrode additive. Therefore, the negative electrode mixture layer may be regarded as a negative electrode active material-containing layer, for example.

The negative electrode mixture layer contains a titanium-containing oxide. The titanium-containing oxide may be included in the negative electrode mixture layer as a negative electrode active material.

For the titanium-containing oxide, for example, it is possible to use lithium titanate having a spinel-type crystal structure (for example, $Li_{4+s}Ti_5O_{12}$ (where s varies within the range of $-0.1 \leq s \leq 3.1$ depending on the state of charge); hereinafter referred to as LTO as well). When a negative electrode active material containing this material is used, it is possible to suppress the precipitation of lithium dendrite in association with charge-and-discharge cycles, and this can suppress the reduction in lithium ions in the system of the nonaqueous electrolyte secondary battery. Owing to this, such a nonaqueous electrolyte secondary battery can suppress the deterioration of diffusibility of lithium ions in association with charge-and-discharge cycles, and can exhibit a better capacity retention. In addition, since it is possible to suppress the precipitation of lithium dendrite which may cause an electrical short circuit between the positive electrode and the negative electrode, excellent safety can be exhibited.

Other examples of the titanium-containing oxide include monoclinic niobium-titanium composite oxide, rutile-type $TiO_2$, anatase-type $TiO_2$, bronze-type $TiO_2$, and orthorhombic Na-containing niobium-titanium composite oxide.

The negative electrode mixture layer may contain plural kinds of titanium-containing oxides. It is preferable that the negative electrode mixture layer contains LTO. Furthermore, the negative electrode may contain a negative electrode active material other than the titanium-containing oxide.

The negative electrode active material contains the titanium-containing oxide in an amount preferably within the range from 80% by weight to 100% by weight, more preferably within the range from 90% by weight to 100% by weight. It is most preferably that the negative electrode active material consists of spinel-type lithium titanate.

The conductive agent can be mixed as necessary to increase the current-collection performance and to suppress the contact resistance between the active material and the current collector. Examples of the conductive agent in the negative electrode include a carbon material. The carbon material preferably has high absorbability for an alkali metal, and high conductivity. Examples of the carbon material include carbon black (e.g., acetylene black), carbon nanotubes, and graphite.

The binder can bind the active material and the current collector. Examples of the binder in the negative electrode include polytetrafluoroethylene (PTFE), polyvinylidene fluoride (PVdF), fluorine rubber, styrene-butadiene rubber (SBR), polypropylene (PP), polyethylene (PE), and carboxymethyl cellulose (CMC).

The negative electrode additive is, for example, a substance capable of generating the first compound containing Mn and the $CO_3$ moiety in the negative electrode mixture layer. For a negative electrode additive, a transition metal compound is suitable, and examples thereof include manganese carbonate, manganese phosphate, and manganese oxide. The negative electrode mixture layer preferably contains manganese carbonate.

For the negative electrode current collector, for example, a sheet containing a material having high electric conductivity can be used. For example, copper foil, aluminum foil or aluminum alloy foil can be used as the negative electrode current collector. The thickness thereof is, for example, 20 μm or less, preferably 15 μm or less.

The negative electrode can be produced, for example, by the following procedure.

First, a negative electrode active material, a conductive agent, a binder and a negative electrode additive are provided. They are put into an appropriate dispersion medium to prepare a negative electrode slurry. At this time, it is preferable that the weight ratios of the negative electrode active material, the conductive agent, the binder, and the negative electrode additive to be put into the dispersion medium are set to 70 to 98% by weight, 0 to 20% by weight, 2 to 10% by weight, and 0 to 0.1% by weight, respectively.

The negative electrode slurry thus obtained is coated on the surface of the negative electrode current collector, dried, and pressed. In this manner, the negative electrode including the negative electrode current collector and the negative electrode mixture layer supported on the negative electrode current collector can be obtained.

For example, by using manganese carbonate as a negative electrode additive, the first compound containing Mn and the $CO_3$ moiety can be incorporated into the negative electrode mixture layer.

In addition, the first compound containing Mn and the $CO_3$ moiety can be incorporated into the negative electrode mixture layer by preparing a negative electrode using a manganese compound other than manganese carbonate such as manganese oxide or manganese phosphate as a negative electrode additive, then adding, for example, a Li salt such as lithium bis(oxalate)borate (LiBOB) to the nonaqueous electrolyte, assembling the nonaqueous electrolyte secondary battery, and subjecting this nonaqueous electrolyte secondary battery to aging.

Alternatively, for example, the first compound containing Mn and the $CO_3$ moiety can be incorporated into the negative electrode mixture layer by adding manganese oxalate as an additive to the nonaqueous electrolyte, assembling the nonaqueous electrolyte secondary battery, and subjecting this nonaqueous electrolyte secondary battery to aging.

Should be noted that in a nonaqueous electrolyte secondary battery prepared using a manganese compound other than manganese carbonate as a negative electrode additive, at least a part of the portion which has not changed to manganese carbonate of the manganese compound other than manganese carbonate may be included in the negative electrode mixture layer. Therefore, the negative electrode mixture layer can contain a manganese compound other than manganese carbonate as a compound containing Mn. In addition, in a nonaqueous electrolyte secondary battery prepared using manganese oxalate as an additive of the nonaqueous electrolyte, at least a part of the portion which has not changed to manganese carbonate of manganese oxalate may be included in the negative electrode mixture layer. Therefore, the negative electrode mixture layer can contain manganese oxalate as a compound containing Mn.

(Positive Electrode)

The positive electrode mixture layer which can be included in the positive electrode may include, for example, a positive electrode active material, a conductive agent, and a binder. Therefore, the positive electrode mixture layer may be regarded as a positive electrode active material-containing layer.

Examples of the positive electrode active material include a lithium manganese complex oxide (e.g., $Li_tMn_2O_4$ ($0 \leq t \leq 1.3$) or $Li_tMnO_2$ ($0 \leq t \leq 0.65$)), a lithium nickel composite oxide (e.g., $Li_tNiO_2$ ($0 \leq t \leq 1.3$)), a lithium cobalt composite oxide (e.g., $Li_tCoO_2$ ($0 \leq t \leq 1.3$)), a lithium nickel cobalt composite oxide (e.g., $Li_tNi_{1-x}CO_xO_2$ ($0 < x \leq 1$, $0 \leq t \leq 1.3$)), and a lithium manganese cobalt composite oxide (e.g., $LiMn_xCo_{1-x}O_2$ ($0 < x \leq 1$, $0 \leq t \leq 1.3$)). Such a composite oxide can provide excellent energy density. In particular, in order to improve safety at the time of overcharging, it is preferable that the positive electrode active material is spinel-type lithium manganate ($Li_tMn_2O_4$ ($0 \leq t \leq 1.3$)). This is because lithium manganate having a spinel-type crystal structure is thermally decomposed at high temperature, and can exhibit excellent stability at high temperature. More preferable is spinel-type lithium manganate in which a part of manganese element is substituted with other element ($Li_tMn_{2-x}M_xO_4$ ($0 < x < 0.3$, $0 \leq t \leq 1.3$, where M is at least one element selected from the group consisting of Li, Mg, Ti, Cr, Fe, Co, Zn, Al, and Ga)).

The positive electrode active material is, for example, particulate. When particulate, the positive electrode active material may be a primary particle or a secondary particle obtained by granulating the primary particles. The positive electrode active material is desirably a primary particle rather than a secondary particle resulting from granulating the primary particles.

The conductive agent can be mixed as necessary to increase the current-collection performance and to suppress the contact resistance between the active material and the current collector. Examples of the conductive agent in the positive electrode include a carbon material. The carbon material preferably has high absorbability for an alkali metal, and high conductivity. Examples of the carbon material include carbon black (e.g., acetylene black), graphite, and carbon nanotubes.

The binder can bind the active material and the current collector. Examples of the binder in the positive electrode include polytetrafluoroethylene (PTFE), polyvinylidene fluoride (PVdF), fluore-based rubber, styrene-butadiene rubber (SBR), polypropylene (PP), polyethylene (PE) and carboxymethyl cellulose (CMC).

For the positive electrode current collector, for example, a sheet containing a material having high electric conductivity can be used. For example, copper foil, aluminum foil or aluminum alloy foil can be used as the positive electrode current collector. The thickness thereof is, for example, 20 μm or less, preferably 15 μm or less.

The positive electrode can be produced, for example, by the following procedure.

First, a positive electrode slurry is prepared. The positive electrode slurry can be prepared in, for example, the following manner. The positive electrode active material together with a conductive agent and a binder are put into an appropriate dispersion medium, and stirred. Thus, a slurry is obtained. Particles in the slurry can be more finely dispersed by placing the slurry in a pulverizer or the like, and it is preferable to disperse the particles. The ratios of the positive electrode active material, the conductive agent, and the binder to be put into the dispersion medium at the time of preparing the slurry are preferably 75 to 97% by weight, 2 to 20% by weight, and 1 to 5% by weight, respectively.

The positive electrode slurry thus obtained is applied to the surface of the positive electrode current collector, dried, and pressed. In this manner, the positive electrode including the positive electrode current collector and the positive electrode mixture layer supported on the positive electrode current collector can be obtained.

(Nonaqueous Electrolyte)

The nonaqueous electrolyte may include a nonaqueous solvent, and a supporting electrolyte dissolved in the nonaqueous solvent.

The supporting electrolyte is, for example, an alkali salt, preferably a lithium salt. Examples of the lithium salt include lithium hexafluorophosphate ($LiPF_6$), lithium tetrafluoroborate ($LiBF_4$), lithium hexafluoroarsenate ($LiAsF_6$), lithium perchlorate ($LiClO_4$) and lithium trifluoromethanesulfonate ($LiCF_3SO_3$). More preferable is lithium hexafluorophosphate ($LiPF_6$) or lithium tetrafluoroborate ($LiBF_4$). The concentration of the supporting electrolyte in the nonaqueous electrolyte is preferably 0.5 to 3.0 M.

The nonaqueous solvent may be a known nonaqueous solvent used for a lithium ion battery. Examples of the nonaqueous solvent include ethylene carbonate (EC), propylene carbonate (PC), dimethyl carbonate (DMC), ethyl methyl carbonate (EMC), diethyl carbonate (DEC), γ-butyrolactone (GBL), acetonitrile (AN), and dimethoxyethane (DME). The nonaqueous solvent may be any one of the above-mentioned solvents, or may be a mixed solvent of plural kinds. It is preferably a mixed solvent containing propylene carbonate (PC). This is because, at a high state-of-charge, propylene carbonate undergoes reductive decomposition at the negative electrode to generate gas. The volume ratio of propylene carbonate in the nonaqueous solvent is preferably 10 to 50% by volume. When the volume ratio of propylene carbonate in the nonaqueous solvent falls within this range, propylene carbonate decomposes on the surface of the negative electrode active material during aging to form a good organic film for the insertion-and-extraction reactions of Li ions, and therefore a low-resistance battery can be obtained. The volume ratio of propylene carbonate in the nonaqueous solvent is more preferably 30 to 50% by volume. The volume ratio of propylene carbonate in the nonaqueous solvent is particularly preferably 30 to 40% by volume.

An additive may be also added to the nonaqueous electrolyte. For the additive, for example, it is possible to use a manganese compound capable of forming the first compound containing Mn and the CO moiety in the negative electrode mixture layer after providing of the battery. Examples of the manganese compound include manganese carbonate and manganese oxalate. An organic compound such as vinylene carbonate (VC) or a Li salt such as lithium bis(oxalate)borate (LiBOB) may be added, and the kind and combination are not particularly limited. The amount of the additive to be added is preferably 0.01 to 3% by weight, more preferably 0.01 to 1% by weight, based on the non-aqueous electrolyte. Alternatively, an additive may not be added to the nonaqueous electrolyte.

(Separator)

The separator is made of an insulating material, and can prevent an electrical contact between the negative electrode and the positive electrode. Preferably, the separator is made of a material through which the supporting electrolyte can pass, or has a shape through which the supporting electrolyte can pass. Examples of the separator include a non-woven fabric of synthetic resin, a polyethylene porous film, a polypropylene porous film, and a cellulose-based separator.

(Negative Electrode Terminal and Positive Electrode Terminal)

For the negative electrode terminal and the positive electrode terminal, it is preferable to use materials having high electric conductivity. If connected to a current collector, the terminals are preferably made of a material similar to that of the current collector to reduce the contact resistance.

(Container Member)

The container member is provided with a gas relief structure. The gas relief structure can release the gas to the outside of the battery when the pressure inside the container member increases to reach a predetermined pressure.

The container member may include, as the gas relief structure, a portion that can tear when the pressure inside the container member rises to a design value or more.

Alternatively, the container member may include, as the gas relief structure, a mechanism capable of releasing the gas inside the container member by being opened when the pressure inside the container member reaches the design value and thereafter sealing the container member by being closed when the pressure inside the container member lowers to a value less than the design value.

The gas relief structure may be, for example, a gas relief vent, a safety valve, a pressure reducing valve, or a gas relief valve.

For the container member, for example, a baggy container made of a laminate film or a metallic container may be used.

For the laminate film, for example, a multilayer film including a metal layer and resin layers sandwiching the metal layer may be used. For the metal layer, it is preferable to use aluminum foil or aluminum alloy foil for weight reduction. For the resin layer, for example, a polymer material such as polypropylene (PP), polyethylene (PE), nylon, polyethylene terephthalate (PET), or the like may be used.

The thickness of the laminate film is preferably 0.5 mm or less, more preferably 0.2 mm or less.

The laminate film can form a container shape by heat-sealing a part of the peripheral edge. That is, the baggy container made of the laminate film may include a heat-sealed portion located at at least a part of the peripheral edge, and the heat-sealed portion is a portion for sealing the members accommodated in the baggy container, i.e., a portion for sealing a space for accommodating the electrode group and the nonaqueous electrolyte. In other words, the space sealed by the heat-sealed portion accommodates the positive electrode, the negative electrode, and the nonaqueous electrolyte. In addition, a part of the heat-sealed portion of the laminate film may be a gas relief vent having a lower sealability than the other part. For example, the gas relief vent has a smaller heat-sealed area and/or is heat-sealed at a lower temperature, as compared to the other part of the heat-sealed portion. When the gas pressure inside the baggy container rises to reach a predetermined pressure, the gas relief vent can cleave earlier than the other part of the heat-sealed portion, thereby forming an opening, and through this opening, the gas inside the baggy container can be released. That is, the gas relief vent can operate as a gas relief structure when the gas pressure inside the battery increases.

The metallic container is made of, for example, aluminum or aluminum alloy, stainless steel, or the like. The aluminum alloy is preferably an alloy containing an element such as magnesium, zinc, silicon, or the like. This is because the alloy containing these elements has a high long-term reliability in a high-temperature environment and a high heat-releasing property.

The metallic container may include, for example, a container main body provided with an opening, and a lid for closing the opening of the container main body. The container main body and the lid can be joined by, for example, welding.

The metallic container may include a portion having a wall thickness smaller than that of the other portion. This portion breaks when the gas pressure inside the battery rises, and can release the gas inside the battery. That is, the metallic container may include a portion that can operate as a gas relief structure when the gas pressure inside the battery increases to reach a predetermined pressure. This portion can be referred to as a gas relief vent or a safety vent. The gas relief vent or the safety vent may be provided with a groove for easier breaking. The gas relief vent or the safety vent may be provided in the container main body or in the lid.

The wall thickness of the portion of the metallic container other than the gas relief structure is preferably 1.0 mm or less, more preferably 0.5 mm or less.

The shape of the container member may be, for example, a flat type (thin type), a prismatic type, a cylindrical type, a coin type, a button type, or the like. The container member may be, for example, a container member for a small battery mounted on a portable electronic device or the like, or a container member for a large battery mounted on a two-wheel or four-wheel automobile or the like, depending on the battery size.

Next, specific examples of the nonaqueous electrolyte secondary battery according to the embodiment will be described with reference to the drawings.

First, with reference to FIGS. 1 and 2, the nonaqueous electrolyte secondary battery according to the first example of the embodiment will be described.

FIG. 1 is a partially cutaway perspective view of the nonaqueous electrolyte secondary battery according to the first example of the embodiment. FIG. 2 is an enlarged sectional view of portion A of the nonaqueous electrolyte secondary battery shown in FIG. 1.

A nonaqueous electrolyte secondary battery 100 shown in FIGS. 1 and 2 includes a flat electrode group 1.

The flat electrode group 1 includes a negative electrode 2, a positive electrode 3, and a separator 4.

As shown in FIG. 2, the negative electrode 2 includes a negative electrode current collector 21, and a negative electrode mixture layer 22 supported on the negative electrode current collector 21. As shown in FIG. 2, in the portion located on the outermost side of the negative electrode 2, the negative electrode mixture layer 22 is not provided on a surface not facing the positive electrode 3 of the two surfaces of the negative electrode current collector 21. In the other portion of the negative electrode 2, the negative electrode mixture layers 22 are formed on both surfaces of the negative electrode current collector. As shown in FIG. 2, the positive electrode 3 includes a positive electrode current collector 31, and positive electrode mixture layer 32 supported on two surfaces of the positive electrode current collector 31.

In the electrode group 1, the negative electrode 2 and the positive electrode 3 are stacked with the separator 4 sandwiched between the negative electrode mixture layer 22 and the positive electrode mixture layer 32. Such an electrode group 1 can be obtained according to the following procedures. First, a plate-shaped negative electrode 2 and a plate-like positive electrode 3 are stacked with a separator 4 interposed therebetween. Next, another separator 4 is stacked on the positive electrode mixture layer 32 not facing the negative electrode 2 to make a stack. This stack is wound. Then, a core is extracted, and the stack is pressed to have a flat shape. Thus, the electrode group 1 shown in FIGS. 1 and 2 can be obtained.

A belt-like negative electrode terminal 5 is electrically connected to the negative electrode 2. A belt-like positive electrode terminal 6 is electrically connected to the positive electrode 3.

The nonaqueous electrolyte secondary battery 100 shown in FIGS. 1 and 2 further includes a baggy container 7 made of a laminate film as a container member.

The electrode group 1 is accommodated in the laminate film baggy container 7 with an end of each of the negative electrode terminal 5 and the positive electrode terminal 6 being extended from the baggy container 7. The laminate film baggy container 7 accommodates a nonaqueous electrolyte (not shown). The electrode group 1 is impregnated with the nonaqueous electrolyte.

The nonaqueous electrolyte secondary battery 100 shown in FIGS. 1 and 2 can be produced in the following manner, for example. First, the electrode group 1 is accommodated in the laminate film baggy container 7 with one end of each of the negative electrode terminal 5 and the positive electrode terminal 6 being extended from the baggy container 7. Thereafter, the peripheral edge portion of the baggy container 7 is heat-sealed with a part thereof left as an opening. Next, the nonaqueous electrolyte is injected into the baggy container 7 via the opening previously left. After the injection, the opening is sealed so that the electrode group 1 and the nonaqueous electrolyte can be sealed in the baggy container 7. A heat-sealed part 71 located at a part of the peripheral edge of the baggy container 7 is a part of the heat-sealed portion located at the peripheral edge, and has a heat-sealed area smaller than that of the other part of the heat-sealed portion; thus, the heat-sealed part 71 has a sealability lower than that of the other part of the heat-sealed portion. Furthermore, the heat-sealed part 71 is heat-sealed at a lower temperature than the other part of the heat-sealed portion. Thus, when the gas pressure inside the battery 100 becomes higher than a predetermined pressure, the heat-sealed part 71 can cleave earlier than the other part, thereby an opening can be formed. That is, the heat-sealed part 71 may be regarded as a gas relief vent that can be opened when the gas pressure inside the battery 100 becomes higher than a predetermined pressure. That is, this part can operate as a gas relief structure.

Next, a nonaqueous electrolyte secondary battery according to the second example of the embodiment will be described with reference to FIG. 3.

FIG. 3 is an exploded perspective view of the nonaqueous electrolyte secondary battery according to the second example of the embodiment.

The nonaqueous electrolyte secondary battery 100 shown in FIG. 3 includes a container body 7, a lid 8, and an electrode group 1.

The container body 7 is made of metal, and has a rectangular cylindrical shape with a bottom and an opening.

In the opening of the container body 7, the lid 8 is provided, and the opening is closed by the lid 8. The container body 7 accommodates the electrode group 1 and the nonaqueous electrolyte (not shown). The container body 7 and the lid 8 constitute a container member.

The lid 8 includes a sealing plate 81. The sealing plate 81 is desirably made of the same type of metal as the container body 7. The peripheral edge portion of the sealing plate 81 is welded to the peripheral edge portion of the opening of the container body 7. The sealing plate 81 is provided with a safety vent 82 that can operate as a gas relief structure.

The safety vent 82 includes a cross groove 83 provided on a bottom surface of a rectangular recess provided in the sealing plate 81. The portion where the groove 83 is provided in the sealing plate 81 is particularly thin. Thus, when the internal pressure of the container body 7 rises, the groove 83 breaks, thereby the gas inside the container body 7 can be released outside.

In addition to the safety vent 82, an injection hole 81a is provided in the sealing plate 81. A positive electrode terminal 84, a negative electrode terminal 85, two external insulator 86, two internal insulators (not shown), and two terminal leads 87 are fixed to the sealing plate 81.

The electrode group 1 includes a plurality of positive electrodes (not shown), a plurality of negative electrodes (not shown), and separators (not shown). The positive electrodes and the negative electrodes are stacked with a separator sandwiched therebetween to form a stack, and the stack thus obtained is wound. The electrode group 1 is impregnated with a nonaqueous electrolyte (not shown). The electrode group 1 shown in FIG. 3 has a structure similar to that of the electrode group 1 shown in FIGS. 1 and 2.

The positive electrode includes a belt-like positive electrode current collector, and a positive electrode mixture layer formed on a part of the surface of the current collector. The positive electrode current collector includes positive electrode current-collecting tabs 33 each having surfaces on which the positive electrode mixture layers is not formed. The positive electrode current-collecting tabs 33 extend from an end surface of the electrode group 1 which faces the lid 8. In FIG. 3, the positive electrode current-collecting tabs 33 are shown as a single member 33 of an assembly.

The negative electrode includes a belt-like negative electrode current collector, and a negative electrode mixture layer formed on a part of the surface of the current collector. The negative electrode current collector includes a plurality of negative electrode current-collecting tabs 23 each having surfaces on which the negative electrode mixture layers is not formed. The plurality of negative electrode current-collecting tabs 23 extend from an end surface of the electrode group 1 which faces the lid 8. In FIG. 3, the negative electrode current-collecting tabs 23 are shown as a single member 23 of an assembly.

The two terminal leads 87 are fixed to the sealing plate 81 together with the positive electrode terminal 84, the negative electrode terminal 85, the two external insulators 86, and the two internal insulators.

The positive electrode terminal 84 and the negative electrode terminal 85 are each electrically insulated from the sealing plate 81. Further, the two terminal leads 87 are insulated from the sealing plate 81.

On the other hand, the positive electrode terminal 84 is electrically connected to one terminal lead 87 which is fixed to the sealing plate 81 together with the positive electrode terminal 84. Likewise, the negative electrode terminal 85 is electrically connected to the other terminal lead 87 which is fixed to the sealing plate 81 together with the negative electrode terminal 85.

In the nonaqueous electrolyte secondary battery 100 shown in FIG. 3, the injection hole 81a provided in the sealing plate 81 constitutes an injection passage for injecting the nonaqueous electrolyte from the outside into the nonaqueous electrolyte secondary battery 100. The injection hole 81a is closed by a metal sealing lid 9. The peripheral edge of the sealing lid 9 is welded to the sealing plate 81.

In the nonaqueous electrolyte secondary battery 100 shown in FIG. 3, the terminal lead 87 electrically connected to the positive electrode terminal 84 is electrically connected to the positive electrode current-collecting tab 33. Furthermore, the terminal lead 87 electrically connected to the negative electrode terminal 85 is electrically connected to the negative electrode current-collecting tab 23.

<X-Ray Photoelectron Spectroscopy Measurement on Negative Electrode Mixture Layer>

Next, a description will be given of a procedure of X-ray photoelectron spectroscopy measurement on the negative electrode mixture layer incorporated in the nonaqueous electrolyte secondary battery.

(1) Preparation of Sample

First, a battery to be measured is provided. The subject to be measured is a battery having a discharge capacity of 80% or more of the rated capacity. That is, a battery with excessive deterioration is not a subject to be measured.

Next, the provided nonaqueous electrolyte secondary battery is discharged until the open circuit voltage reaches 2.0 to 2.2 V. Next, the discharged nonaqueous electrolyte secondary battery is transferred into a glove box having an internal atmosphere with a dew point of −70° C. and filled with argon. Here, the nonaqueous electrolyte secondary battery is disassembled.

Next, a part of the negative electrode is taken out from the disassembled nonaqueous electrolyte secondary battery in the glove box. A sample of approximately 2 cm square is cut out from the taken-out negative electrode.

The cut-out sample is immersed into 50 cc ($cm^3$) of ethyl methyl carbonate for 90 seconds, and washed. The sample is then vacuum dried. Thus, the nonaqueous electrolyte adhering to the sample can be removed.

In this manner, the sample for measurement can be obtained.

(2) Measurement

The sample for measurement is installed into an X-ray photoelectron spectroscope while being sealed in an argon atmosphere. For the spectroscope, an XPS measurement apparatus (VG Theta Probe manufactured by Thermo Fisher Scientific) may be used, for example.

For an exciting X-ray source, AlKa ray diffracted by a single crystal (light obtained by diffracting AlKa ray with single crystal for better monochromaticity) is used. By irradiation of the exciting X-ray source so that the X-ray spot has an elliptical shape of 800×400 μm, an X-ray photoelectron spectrum is obtained.

According to the XPS measurement, it is possible to measure a region from the actual surface of the sample to a depth of, for example, 0 to 10 nm. Therefore, according to the XPS measurement, it is possible to obtain information on the region from the surface of the negative electrode mixture layer to the depth of 0 to 10 nm. In other words, the X-ray photoelectron spectroscopy spectrum of the negative electrode mixture layer may also be regarded as a spectrum of the surface of the negative electrode mixture layer.

(3) Analysis

From the obtained X-ray photoelectron spectrum, the ratios x, y, and z described earlier are calculated in the following manner. When the abundance ratio of each element is obtained from the peak-area ratio, the relative sensitivity factors belonging to the apparatus is used. The constituent elements which are parameters of the abundance ratio are Li, C, O, Ti and Mn. Each peak area is obtained as an area of a Gaussian function by performing fitting analysis using a superposition of a plurality of Gaussian functions. The area of the Gaussian function can be calculated based on the background which is determined using the Shirley method.

The abundance ratio $R_{Ti}$ of Ti is obtained from the area $A_{Ti}$ of the component derived from $Ti^{4+}$, included in the peak belonging to the electrons (Ti 2p 3/2) having the total angular momentum of 3/2 among the electrons of the 2p orbitals of Ti. The peak belonging to the electrons having the total angular momentum of 3/2 among the electrons of the 2p orbitals of Ti appears in the binding energy region of 454 to 460 eV. The component derived from $Ti^{4+}$ has a peak appearing in the binding energy region of 458 to 459 eV. Specifically, first, a peak appearing in the binding energy region of 454 to 460 eV is represented by a superposition of the first Gaussian function representing the component derived from $Ti^{3+}$ having a peak in the binding energy region of 456 to 457 eV, and the second Gaussian function representing the component derived from $Ti^{4+}$ having a peak in the binding energy region of 458 to 459 eV. Here, the area of the second Gaussian function is defined as area $A_{Ti}$ corresponding to the abundance ratio $R_{Ti}$ of Ti.

The X-ray photoelectron spectroscopy spectrum of the negative electrode mixture layer included in the nonaqueous electrolyte secondary battery according to the embodiment includes a peak belonging to the electrons (Ti 2p ½) having the total angular momentum of ½ among the electrons of the 2p orbitals of Ti in the vicinity of the peak belonging to the electrons (Ti 2p 3/2) having the total angular momentum of 3/2 among the electrons of the 2p orbitals of Ti. This is because the peak separation occurs due to difference in the spin state of electrons because of the spin-orbit interaction. The reason why the peak belonging to Ti 2p 3/2 is used as described above is because this peak has more excellent quantitativeness than the peak belonging to Ti 2p ½.

The abundance ratio $R_{Mn}$ of Mn is obtained from the area $A_{Mn}$ of the peak belonging to the electrons (Mn 2p 3/2) having the total angular momentum of 3/2 among the electrons of the 2p orbitals of Mn. It is assumed that the peak belonging to the electrons having the total angular momentum of 3/2 among the electrons of the 2p orbitals of Mn appears in the binding energy region of 638 to 647 eV. Specifically, first, a peak appearing in the binding energy region of 638 to 647 eV is represented by a superposition of four Gaussian functions. The sum of the areas of these four Gaussian functions is defined as area $A_{Mn}$ corresponding to the abundance ratio $R_{Mn}$ of Mn.

The abundance ratio $R_A$ of C constituting the $CO_3$ moiety, the abundance ratio $R_C$ of C constituting the CO moiety, and the abundance ratio $R_D$ of C constituting the $CO_2$ moiety are obtained as follows.

First, from the X-ray photoelectron spectrum obtained earlier, a peak appearing in the binding energy region of 279 to 294 eV is found. This peak is a peak belonging to the is orbit of C. This peak is represented by a superposition of the first Gaussian function having a peak in the binding energy region of 283 to 284 eV, the second Gaussian function having a peak in the binding energy region of 284 to 285 eV, the third Gaussian function having a peak in the binding energy region of 286 to 287 eV, the fourth Gaussian function having a peak in the binding energy region of 287 to 288 eV, the fifth Gaussian function having a peak in the binding energy region of 288 to 289 eV, and the sixth Gaussian function having a peak in the binding energy of 290 to 291 eV. The first Gaussian function and the second Gaussian function may be derived from the carbon material contained in the conductive agent. The third Gaussian function may be derived from C contained in the binder. The area of the fourth Gaussian function is defined as area $A_{CO}$ corresponding to the abundance ratio $R_C$ of C constituting the CO moiety. The area of the fifth Gaussian function is defined as area $A_{CO2}$ corresponding to the abundance ratio $R_D$ of C constituting the $CO_2$ moiety. The area of the sixth Gaussian function is defined as area $A_{CO3}$ corresponding to the abundance ratio $R_A$ of C constituting the $CO_3$ moiety.

The ratio x is $R_{Mn}/R_{Ti}$, that is, the relative abundance ratio $R_{Mn}$ of Mn when the abundance ratio $R_{Ti}$ of Ti is 1. Therefore, the ratio x can be calculated by dividing the value obtained by converting the area $A_{Mn}$ using the relative sensitivity factor, by the value obtained by converting the area $A_{Ti}$ using the relative sensitivity factor.

The ratio y is $R_A/R_{Mn}$, that is, the relative abundance ratio $R_A$ of C constituting the $CO_3$ moiety when the abundance ratio $R_{Mn}$ of Mn is 1. Therefore, the ratio y can be calculated by dividing the value obtained by converting the area $A_{CO3}$ using the relative sensitivity factor by the value obtained, by converting the area $A_{Mn}$ using the relative sensitivity factor.

The ratio z is $R_A/R_B$, that is, the relative abundance ratio $R_A$ of C constituting the $CO_3$ moiety when the sum $R_B$ of the abundance ratios of C constituting the CO moiety and the $CO_2$ moiety is 1. Therefore, the ratio z is calculated by the following procedure. First, the areas $A_{CO3}$, $A_{CO}$ and $A_{CO2}$ are converted into abundance ratios $R_A$, $R_C$ and $R_D$ using the respective relative sensitivity factors. The abundance ratios $R_C$ and $R_D$ are added up to obtain the sum $R_B$ of the abundance ratios. The ratio z can be calculated by dividing the abundance ratio $R_A$ by the sum $R_B$ of the abundance ratios.

Next, with reference to FIGS. 4 to 6, several X-ray photoelectron spectroscopy spectra (XPS spectra) of an exemplary negative electrode mixture layer will be described.

Figure 5:
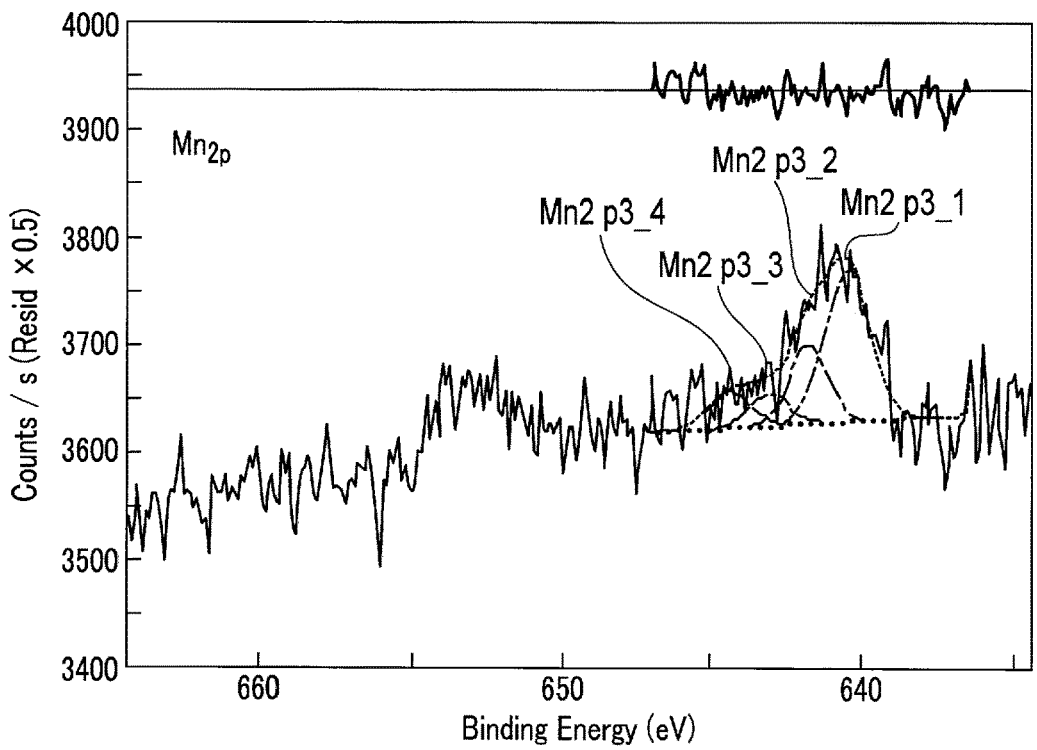
FIG. 5 is an XPS spectrum of the negative electrode mixture layer of the nonaqueous electrolyte secondary battery according to the example of the embodiment.

FIGS. 4 to 6 show three XPS spectra of the negative electrode mixture layer of a nonaqueous electrolyte secondary battery according to an example of the embodiment.

The nonaqueous electrolyte secondary battery including the negative electrode whose XPS spectra of the negative electrode mixture layer are shown in FIGS. 4 to 6 was produced by the production method of Example 1 described in detail in [Examples] later in this specification.

In each of FIGS. 4 to 6, the spectrum indicated by the solid line is the actually measured XPS spectrum. The spectrum indicated by the solid line in FIG. 4 includes a peak which appeared in the binding energy region of 454 eV to 461 eV and which belongs to electrons (Ti 2p 3) having the total angular momentum of 3/2 among the electrons of the 2p orbitals of Ti. The spectrum indicated by the solid line in FIG. 5 includes a peak appearing in the binding energy region of 638 eV to 647 eV and belonging to electrons having the total angular momentum of 3/2 among the electrons of the 2p orbitals of Mn. The spectrum indicated by the solid line in FIG. 6 includes a peak appearing in the binding energy region of 279 eV to 294 eV and belonging to the is orbital of C.

In each of FIG. 4 to 6, the curve indicated by the dashed-dotted line is the Gauss function (calculated value) of each peak component. In each of FIGS. 4 to 6, the spectrum indicated by the broken line is a spectrum generated by superposition the Gaussian functions of the peak components. In each of FIGS. 4 to 6, the curve indicated by the dotted line shows a baseline. In each of FIGS. 4 to 6, the solid line at an upper side is the difference between the actually measured spectrum indicated by the solid line and the fitting spectrum indicated by the broken line.

[Production Method]

The nonaqueous electrolyte secondary battery according to the embodiment can be produced in the following manner, for example.

First, the positive electrode and the negative electrode are prepared as described above. The electrode group is prepared as described above using the prepared positive and negative electrodes. Meanwhile, the nonaqueous electrolyte is prepared. The prepared electrode group and the prepared nonaqueous electrolyte are accommodated in the container member having the gas relief structure.

As described above, for example, by preparing the negative electrode using manganese carbonate as a negative electrode additive, the first compound containing Mn and the $CO_3$ moiety may be incorporated into the negative electrode mixture layer. A specific example of this production method will be described in [Examples] below.

In addition, the first compound containing Mn and the $CO_3$ moiety may be incorporated into the negative electrode mixture layer by preparing a negative electrode using a manganese compound other than manganese carbonate such as manganese oxide or manganese phosphate as a negative electrode additive, adding, for example, a Li salt such as lithium bis(oxalate)borate (LiBOB) to the nonaqueous electrolyte, assembling the nonaqueous electrolyte secondary battery, and subjecting this nonaqueous electrolyte secondary battery to aging. A specific example of this production method will also be described in [Examples] below.

Alternatively, for example, the first compound containing Mn and the $CO_3$ moiety may be included in the negative electrode mixture layer by adding manganese oxalate as an additive to the nonaqueous electrolyte, assembling the nonaqueous electrolyte secondary battery, and subjecting this nonaqueous electrolyte secondary battery to aging. A specific example of this producing method will also be described in [Examples] below.

The aging on the nonaqueous electrolyte secondary battery is preferably carried out at a temperature of 40 to 100° C. for 1 hour to 1 week. By carrying out aging according to this preferable aspect, a good organic film is formed on the surface of the negative electrode active material, and a battery with low resistance can be obtained. The aging is more preferably carried out at a temperature of 60 to 70° C. for 10 hours to 100 hours.

According to the embodiment, a nonaqueous electrolyte secondary battery is provided. The nonaqueous electrolyte secondary battery includes a container member, a negative electrode, a positive electrode, and a nonaqueous electrolyte. The container member is provided with a gas relief structure. The container member accommodates the negative electrode, the positive electrode, and the nonaqueous electrolyte. The negative electrode includes a negative electrode mixture layer. The negative electrode mixture layer contains a titanium-containing oxide and Mn. Abundance ratios $R_{Ti}$, $R_{Mn}$, $R_A$ and $R_B$ obtained according to an X-ray photoelectron spectroscopy spectrum of the negative electrode mixture layer satisfy the following relational expressions: $0.01 \leq R_{Mn}/R_{Ti} \leq 0.2$ (1); $3 \leq R_A/R_{Mn} \leq 50$ (2); and $0.5 \leq R_A/R_B \leq 5$ (3). $R_{Ti}$ is an abundance ratio of Ti. $R_{Mn}$ is an abundance ratio of Mn. $R_A$ is an abundance ratio of C constituting the $CO_3$ moiety. $R_B$ is a sum of an abundance ratio $R_C$ of C constituting the CO moiety and an abundance ratio $R_D$ of C constituting the $CO_2$ moiety. This nonaqueous electrolyte secondary battery can raise, while suppressing the increase in the resistance value, the gas pressure inside the battery, that is, in the space surrounded by the container member, in a state-of-charge lower than a state-of-charge that leads to rupture. As a result, the nonaqueous electrolyte secondary battery can exhibit low resistance and can exhibit excellent safety.

EXAMPLES

Examples will be described below, but the present invention is not limited to the examples described below as long as the gist of the present invention is not exceeded.

Example 1

In Example 1, a nonaqueous electrolyte secondary battery was produced by the following procedures.

<Production of Positive Electrode>

A powder of spinel-type lithium manganate (LMO) represented by composition formula $LiMn_2O_4$ was provided as a positive electrode active material. In addition, acetylene black and graphite as a conductive agent and polyvinylidene fluoride (PVdF) as a binder were provided. They were put into N-methylpyrrolidone (NMP) and mixed in a manner that the mixing ratio of the positive electrode active material powder:acetylene black:graphite:PVdF was 100:5:5:3 in weight ratio. Thus, a positive electrode slurry was prepared.

Next, the positive electrode slurry was coated on both surfaces of the positive electrode current collector made of an aluminum foil having a thickness of 15 μm. At the time of coating, a portion not coated with the positive electrode slurry was left on the positive electrode current collector. Next, the coated film was dried, and the dried film was pressed. In this manner, the positive electrode including the positive electrode current collector and the positive electrode mixture layers formed on both surfaces thereof was produced.

A belt-like positive electrode terminal was electrically connected by ultrasonic welding to the portion not coated with the positive electrode slurry of the positive electrode current collector.

<Production of Negative Electrode>

First, a powder of lithium titanate ($Li_4Ti_5O_{12}$:LTO) having a spinel-type crystal structure as a negative electrode active material was provided. Further, graphite as a conductive agent, PVdF as a binder, and a manganese carbonate powder as an additive were provided. They were put into NMP and mixed in a manner that the mixing ratio of negative electrode active material (LTO) powder:graphite:PVdF:manganese carbonate power was 100:10:3:0.03 in weight ratio. Thus, a negative electrode slurry was prepared.

This negative electrode slurry was coated on both surfaces of the negative electrode current collector made of an aluminum foil having a thickness of 15 μm. At the time of coating, a portion not coated with the slurry was left on the negative electrode current collector. Next, the coated film was dried, and the dried film was pressed. In this manner, the negative electrode including the negative electrode current collector and the negative electrode mixture layers formed on both surfaces thereof was produced.

A belt-like negative electrode terminal was electrically connected by ultrasonic welding to the portion not coated with the slurry of the negative electrode current collector.

<Production of Electrode Group>

The positive electrode produced as described above, a separator made of cellulose having a thickness of 20 μm, the negative electrode produced as described above, and another separator were stacked in this order to obtain a stack. The stack was spirally wound so that the negative electrode was positioned at the outermost periphery, thereby producing an electrode group. After a core was extracted, the wound stack was subjected to hot pressing at 90° C. In this manner, a flat electrode group having a width of 58 mm, a height of 95 mm, and a thickness of 3.0 mm was produced.

<Production of Container Member>

Two laminate films were provided. The laminate film was formed by an aluminum foil having a thickness of 40 μm and polypropylene layers provided on both surfaces of the aluminum foil, and had a thickness of 0.1 mm, a width of 78 mm, and a length of 115 mm. The center of each laminate film was press-molded so that a rectangular parallelepiped depression was formed to have a width of 58 mm, a length of 95 mm and a thickness of 1.5 mm. Upon press-molding, a seal margin of 10 mm was left around the rectangular parallelepiped depression. That is, the laminate film subjected to press-molding had first and second seal margins extending in the long-side direction and third and fourth seal margins extending in the short-side direction. The rectangular parallelepiped depression was surrounded by these margins. The four seal margins each had a width of 10 mm. One end of the first seal margin was shared with one end of the third seal margin while the other end of the first seal margin was shared with one end of the fourth seal margin. Similarly, one end of the second seal margin is shared with the other end of the third seal margin while the other end of the second seal margin is shared with the other end of the fourth seal margin.

Next, the two laminate films were superimposed so that a rectangular parallelepiped space was generated at the center to have a width of 58 mm, a length of 95 mm and a thickness of 3 mm. Next, the first seal margins of the two laminate film facing each other were heat-sealed and the third seal margins of the two laminate films facing each other were heat-sealed so that each sealed portion had a width of 10 mm. In this manner, the baggy container made of the laminate film was produced as the container member.

<Accommodation of Electrode Group>

The electrode group produced as described above was accommodated in the baggy container produced as described above. At this time, one end of the positive electrode terminal and one end of the negative electrode terminal were extended from the short side including the non heat-sealed fourth seal margin of the baggy container. Next, in this state, the fourth seal margins of the two laminated films facing each other were heat-sealed so that the seal portion had a width of 10 mm. The second seal margins of the laminate films were not heat-sealed, and were left as an opening.

Next, the electrode group in the state of being accommodated in the baggy container was subjected to vacuum drying at 100° C. for 24 hours.

<Preparation of Nonaqueous Electrolyte>

A nonaqueous electrolyte was prepared by the following procedure.

First, for a nonaqueous solvents, propylene carbonate (PC) and ethyl methyl carbonate (EMC) were mixed in a volume ratio of 1:2 to prepare a mixed solvent. Lithium hexafluorophosphate ($LiPF_6$) as a supporting electrolyte was dissolved at a concentration of 1.0M in the mixed solvent to prepare a nonaqueous electrolyte. In Example 1, no additive was used in preparing the nonaqueous electrolyte.

<Sealing of Opening of Battery and Production of Gas Relief Portion>

Next, the previously prepared nonaqueous electrolyte was injected into the baggy container accommodating the electrode group subjected to the vacuum drying, through the opening left without being heat-sealed, that is, the part surrounded by the second seal margins facing each other of the two laminate films. Thereafter, the second seal margins facing each other of the opening were heat-sealed so that the seal portion had a width of 5 mm, and this was used as a gas relief portion. Of the sealed portion on the periphery of the baggy container, only the gas relief portion was set to have a narrow width. In addition, of the sealed portion on the periphery of the baggy container, only the gas relief portion was set to have a heat sealing temperature of 180° C. while the other portion was set to have 195° C. Thereby, when the gas pressure inside the baggy container of the battery becomes high, the sealed portion of the gas relief portion cleave, and gas can be discharged therefrom.

Thus, the battery unit was assembled.

<Aging>

Next, the battery unit produced was charged. The charging conditions were set so that the negative electrode potential was 1.6 V vs $Li/Li^+$ or less, and adjusted so that the SOC was greater than 0% after aging. Next, the charged battery was left for aging in a temperature environment of 60° C. for 100 hours.

Thus, the nonaqueous electrolyte secondary battery of Example 1 was produced.

Comparative Example 1

In Comparative Example 1, a nonaqueous electrolyte secondary battery of Comparative Example 1 was produced by the same procedure as in Example 1 except for the following points.

In Comparative Example 1, manganese carbonate was not added in preparing the negative electrode slurry. In addition, in Comparative Example 1, the provided materials of the negative electrode were put into NMP and mixed in a manner that the mixing ratio of LTO powder:graphite:PVdF was 100:10:3 in weight ratio to thereby prepare a negative electrode slurry.

Examples 2 and 3 and Comparative Example 2

In Examples 2 and 3 and Comparative Example 2, a nonaqueous electrolyte secondary battery of each of Examples 2 and 3 and Comparative Example 2 was produced in the same manner as in Example 1 except that the mixing ratios of the materials were changed in preparing the negative electrode slurry as will be described below. For a solvent for preparing the negative electrode slurry, NMP was used.

In Example 2, the mixing ratios of LTO powder:graphite: PVdF:manganese carbonate powder was set to 100:10:3: 0.01 in weight ratio.

In Example 3, the mixing ratios of LTO powder:graphite: PVdF:manganese carbonate powder was set to 100:10:3:0.1 in weight ratio.

In Comparative Example 2, the mixing ratio of LTO powder:graphite:PVdF:manganese carbonate powder was set to 100:10:3:0.3 in weight ratio.

Example 4

In Example 4, a nonaqueous electrolyte secondary battery of Example 4 was produced by the same procedure as in Comparative Example 1 except that a nonaqueous electrolyte was prepared in the following manner.

In Example 4, a powder of manganese oxalate was added as an additive to the nonaqueous electrolyte prepared in the same manner as in Example 1. The added amount was 0.1% by weight based on the weight of the negative electrode active material. After the addition, the nonaqueous electrolyte was stirred for 24 hours in an inert atmosphere using a magnetic stirrer. The nonaqueous electrolyte thus prepared was injected into the baggy container accommodating the electrode group subjected to vacuum drying in the same procedure as described above.

Example 5

In Example 5, a negative electrode secondary battery of Example 5 was produced by the same procedure as in Comparative Example 1 except that a negative electrode slurry and a nonaqueous electrolyte were prepared in the following manner.

In Example 5, a powder of manganese phosphate was further used in preparing the negative electrode slurry. The provided materials of the negative electrode were put to NMP and mixed in a manner that the mixing ratio of LTO powder:graphite:PVdF:manganese phosphate powder was 100:10:3:0.03 in weight ratio. Thus, the negative electrode slurry was prepared.

Furthermore, in Example 5, lithium bis(oxalate) borate (LiBOB) was added as an additive to the nonaqueous electrolyte prepared in the same manner as in Example 1. The added amount was 1.0% by weight based on the total weight of the nonaqueous electrolyte. After the addition, the nonaqueous electrolyte was stirred for 24 hours in an inert atmosphere using a magnetic stirrer. Thus, the nonaqueous electrolyte was prepared.

Comparative Examples 3 and 4

In Comparative Examples 3 and 4, a nonaqueous electrolyte secondary battery of each of Comparative Examples 3 and 4 was produced in the same manner as in Example 1 except that lithium carbonate (Comparative Example 3) and manganese phosphate (Comparative Example 4) were used instead of manganese carbonate in preparing the negative electrode slurry.

In Comparative Example 3, the provided materials of the negative electrode were put into NMP and mixed in a manner that the mixing ratio of LTO powder:graphite:PVdF:lithium carbonate powder was 100:10:3:0.02 in weight ratio to thereby prepare a negative electrode slurry.

Likewise, in Comparative Example 4, the provided materials of the negative electrode were put into NMP and mixed in a manner that the mixing ratio of LTO powder:graphite:PVdF:manganese phosphate powder was 100:10:3:0.03 in weight ratio to thereby prepare a negative electrode slurry.

Comparative Example 5

In Comparative Example 5, a nonaqueous electrolyte secondary battery of Comparative Example 5 was produced by the same procedure as Comparative Example 4 except that the aging temperature was set to 80° C.

Examples 6 and 7

In Examples 6 and 7, a nonaqueous electrolyte secondary battery of each of Examples 6 and 7 was produced in the same procedure as in Example 1 except that the positive electrode active material was changed.

In Example 6, for the positive electrode active material, a powder of lithium nickel cobalt manganese composite oxide ($LiNi_{0.5}Co_{0.2}Mn_{0.3}O_2$) was used. In Example 7, for the positive electrode active material, a powder of lithium cobalt oxide ($LiCoO_2$) was used. The mixing ratio in preparing the positive electrode slurry was the same as that in Example 1.

Comparative Examples 6 and 7

In Comparative Examples 6 and 7, a nonaqueous electrolyte secondary battery of each of Comparative Examples 6 and 7 was produced by the same procedure as in Comparative Example 1 except that the positive electrode active material was changed.

In Comparative Example 6, for the positive electrode active material, a powder of lithium nickel cobalt manganese composite oxide ($LiNi_{0.5}Co_{0.2}Mn_{0.3}O_2$) was used. In Comparative Example 7, for the positive electrode active material, a powder of lithium cobalt oxide ($LiCoO_2$) was used. The mixing ratio in preparing the positive electrode slurry was the same as that in Example 1.

Examples 8 to 11

In Examples 8 to 11, a nonaqueous electrolyte secondary battery of each of Examples 8 to 11 was produced by the same procedure as in Example 1 except that the composition of the mixed solvent was changed in preparing the nonaqueous electrolyte.

In Example 8, a mixed solvent was prepared by mixing propylene carbonate (PC), ethylene carbonate (EC), and ethyl methyl carbonate (EMC) to have a volume ratio of 1:1:4.

In Example 9, a mixed solvent was prepared by mixing EC and EMC to have a volume ratio of 1:2.

In Example 10, a mixed solvent was prepared by mixing PC and EMC to have a volume ratio of 1:5.

In Example 11, a mixed solvent was prepared by mixing PC and EMC to have a volume ratio of 1:1.

(X-Ray Photoelectron Spectroscopy Measurement on Surface of Negative Electrode)

The negative electrode mixture layer of each of the nonaqueous electrolyte secondary batteries of Examples and Comparative Examples was subjected to the X-ray photoelectron spectroscopy measurement according to the above-described method, and Table 1 below shows the results. Table 2 below shows items changed from those of Example 1 in Examples 2 to 11 and Comparative Examples 1 to 7 among the conditions of production the nonaqueous electrolyte secondary battery. Should be noted that in Comparative Examples 3 and 7, the values of x and y were not calculated because the abundance ratio $R_{Mn}$ was less than the detection lower limit.

TABLE 1

|  | $R_{Mn}/R_{Ti}$ (x) | $R_A/R_{Mn}$ (y) | $R_A/R_B$ (z) |
|---|---|---|---|
| Example 1 | 0.022 | 21 | 1.8 |
| Comparative Example 1 | 0.001 | 2600 | 0.41 |

TABLE 1-continued

|  | $R_{Mn}/R_{Ti}$ (x) | $R_A/R_{Mn}$ (y) | $R_A/R_B$ (z) |
|---|---|---|---|
| Example 2 | 0.011 | 29 | 1.3 |
| Example 3 | 0.13 | 6.8 | 3.6 |
| Comparative Example 2 | 0.22 | 2.8 | 5.1 |
| Example 4 | 0.052 | 33 | 2.2 |
| Example 5 | 0.020 | 29 | 2.6 |
| Comparative Example 3 | * | * | 1.9 |
| Comparative Example 4 | 0.024 | 2.8 | 0.42 |
| Comparative Example 5 | 0.023 | 27 | 0.41 |
| Example 6 | 0.021 | 22 | 1.8 |
| Comparative Example 6 | 0.001 | 2900 | 0.41 |
| Example 7 | 0.020 | 25 | 1.7 |
| Comparative Example 7 | * | * | 0.42 |
| Example 8 | 0.021 | 13 | 2.2 |
| Example 9 | 0.022 | 3.3 | 4.9 |
| Example 10 | 0.022 | 14 | 2.2 |
| Example 11 | 0.021 | 28 | 1.1 |

Annotation)
* In Comparative Examples 3 and 7, ratios x and y were not calculated because $R_{Mn}$ was less than detection lower limit.

From the results shown in Table 1, it can be seen that in the nonaqueous electrolyte secondary battery of each of Examples 1 to 11, the ratios x, y and z obtained from the X-ray photoelectron spectroscopy spectrum of the negative electrode mixture layer were within the ranges of $0.01 \leq x \leq 0.2$; $3 \leq y \leq 50$; $0.5 \leq z \leq 5$, respectively. As described earlier, when the ratios x, y and z are within the above-indicated ranges, the negative electrode mixture layer can include the first compound containing Mn and the $CO_3$ moiety.

(Resistance Measurement)

The nonaqueous electrolyte secondary battery of each of Examples and Comparative examples was charged until the battery voltage reached 2.5 V. Next, the resistance value of each nonaqueous electrolyte secondary battery in this state was measured. For Examples 1 to 5 and 8 to 11 and Comparative Examples 1 to 5, the resistance values measured are shown in Table 3 as relative values with reference to Comparative Example 1 (100). For Example 6 and Comparative Example 6, the resistance values measured are shown in Table 4 as relative values with reference to Comparative Example 6 (100). For Example 7 and Comparative Example 7, the resistance values measured are shown in Table 5 as relative values with reference to Comparative Example 7 (100).

TABLE 2

|  | Negative Electrode Additive/Added Amount*[1] | Electrolyte Additive/Added Amount | Aging Temperature | Composition of Positive Electrode Active Material | Composition of Mixed Solvent [Volume Ratio] |
|---|---|---|---|---|---|
| Example 1 | Manganese Carbonate/ 0.03 | None | 60° C. | $LiMn_2O_4$ | PC:EMC = 1:2 |
| Comparative Example 1 | None | None | 60° C. | $LiMn_2O_4$ | PC:EMC = 1:2 |
| Example 2 | Manganese Carbonate/ 0.01 | None | 60° C. | $LiMn_2O_4$ | PC:EMC = 1:2 |
| Example 3 | Manganese Carbonate/ 0.1 | None | 60° C. | $LiMn_2O_4$ | PC:EMC = 1:2 |
| Comparative Example 2 | Manganese Carbonate/ 0.3 | None | 60° C. | $LiMn_2O_4$ | PC:EMC = 1:2 |
| Example 4 | None | Manganese Oxalate/0.1*[2] | 60° C. | $LiMn_2O_4$ | PC:EMC = 1:2 |
| Example 5 | Manganese Phosphate/ 0.03 | LiBOB/ 1.0 wt %*[3] | 60° C. | $LiMn_2O_4$ | PC:EMC = 1:2 |
| Comparative Example 3 | Lithium Carbonate/ 0.02 | None | 60° C. | $LiMn_2O_4$ | PC:EMC = 1:2 |
| Comparative Example 4 | Manganese Phosphate/ 0.03 | None | 60° C. | $LiMn_2O_4$ | PC:EMC = 1:2 |
| Comparative Example 5 | Manganese Phosphate/ 0.03 | None | 80° C. | $LiMn_2O_4$ | PC:EMC = 1:2 |
| Example 6 | Manganese Carbonate/ 0.03 | None | 60° C. | $LiNi_{0.5}Co_{0.2}Mn_{0.3}O_2$ | PC:EMC = 1:2 |
| Comparative Example 6 | None | None | 60° C. | $LiNi_{0.5}Co_{0.2}Mn_{0.3}O_2$ | PC:EMC = 1:2 |
| Example 7 | Manganese Carbonate/ 0.03 | None | 60° C. | $LiCoO_2$ | PC:EMC = 1:2 |
| Comparative Example 7 | None | None | 60° C. | $LiCoO_2$ | PC:EMC = 1:2 |
| Example 8 | Manganese Carbonate/ 0.03 | None | 60° C. | $LiMn_2O_4$ | PC:EC:EMC = 1:1:4 |
| Example 9 | Manganese Carbonate/ 0.03 | None | 60° C. | $LiMn_2O_4$ | EC:EMC = 1:2 |
| Example 10 | Manganese Carbonate/ 0.03 | None | 60° C. | $LiMn_2O_4$ | PC:EMC = 1:5 |
| Example 11 | Manganese Carbonate/ 0.03 | None | 60° C. | $LiMn_2O_4$ | PC:EMC = 1:1 |

Annotation)
*[1]Added amount of negative electrode additive is represented by weight ratio relative to 100 parts by weight of negative electrode active material.
*[2]Added amount of manganese oxalate is represented by weight ratio relative to 100 parts by weight of negative electrode active material.
*[3]Added amount of LiBOB is represented by wt % relative to total amount of nonaqueous electrolyte.

(Over-Charge Test)

The nonaqueous electrolyte secondary battery of each of Examples and Comparative Examples was charged at a current value of 1 C at an environment temperature of 25° C. until the sealed portion was opened. For Examples 1 to 5 and 8 to 11 and Comparative Examples 1 to 5, the states of charge (SOC) when the sealed portion was opened are shown in Table 3 as relative values with reference to Comparative Example 1 (100). For Example 6 and Comparative Example 6, the states of charge (SOC) when the sealed portion was opened are shown in Table 4 as relative values with reference to Comparative Example 6 (100). For Example 7 and Comparative Example 7, the states of charge (SOC) when the sealed portion was opened are shown in Table 5 as relative values with reference to Comparative Example 7 (100).

In the over-charge test, the nonaqueous electrolyte secondary battery that has released gas with a lower SOC can exhibit superior safety.

TABLE 3

| | SOC at the Time of Gas Release [Comparison to Comparative Example 1] | Resistance Value [Comparison to Comparative Example 1] |
|---|---|---|
| Example 1 | 64 | 99 |
| Example 2 | 91 | 100 |
| Example 3 | 62 | 117 |
| Comparative Example 1 | 100 (Reference) | 100 (Reference) |
| Comparative Example 2 | 60 | 235 |
| Example 4 | 72 | 104 |
| Example 5 | 73 | 99 |
| Comparative Example 3 | 102 | 103 |
| Comparative Example 4 | 99 | 104 |
| Comparative Example 5 | 96 | 183 |
| Example 8 | 81 | 105 |
| Example 9 | 90 | 113 |
| Example 10 | 82 | 96 |
| Example 11 | 60 | 105 |

TABLE 4

| | SOC at the Time of Gas Release [Comparison to Comparative Example 6] | Resistance Value [Comparison to Comparative Example 6] |
|---|---|---|
| Example 6 | 85 | 100 |
| Comparative Example 6 | 100 (Reference) | 100 (Reference) |

TABLE 5

| | SOC at the Time of Gas Release [Comparison to Comparative Example 7] | Resistance Value [Comparison to Comparative Example 7] |
|---|---|---|
| Example 7 | 88 | 101 |
| Comparative Example 7 | 100 (Reference) | 100 (Reference) |

From the results shown in Table 3, it can be seen that the nonaqueous electrolyte secondary batteries of Examples 1 to 5 and 8 to 11 were able to release gas with lower SOC than that of the nonaqueous electrolyte secondary battery of Comparative Example 1. In addition, it can be seen that the nonaqueous electrolyte secondary batteries of Examples 1 to 5 and 8 to 11 were able to exhibit the resistance value about the same as that of Comparative Example 1.

Further, from the results shown in Table 4, it can be seen that the nonaqueous electrolyte secondary battery of Example 6 was able to release gas with lower SOC than that of the nonaqueous electrolyte secondary battery of Comparative Example 6. In addition, it can be seen that the nonaqueous electrolyte secondary battery of Example 6 was able to exhibit the resistance value about the same as that of the nonaqueous electrolyte secondary battery of Comparative Example 6.

Further, from the results shown in Table 5, it can be seen that the nonaqueous electrolyte secondary battery of Example 7 was able to release gas with lower SOC than that of the nonaqueous electrolyte secondary battery of Comparative Example 7. In addition, it can be seen that the nonaqueous electrolyte secondary battery of Example 7 was able to exhibit the resistance value about the same as the nonaqueous electrolyte secondary battery of Comparative Example 7.

From these results, it can be seen that the nonaqueous electrolyte secondary batteries of Examples 1 to 11 were able to exhibit low resistance values and excellent safety.

On the other hand, in the negative electrode of the nonaqueous electrolyte secondary battery of Comparative Example 1, the value of the ratio x was 0.001. In the nonaqueous electrolyte secondary battery of Comparative Example 1, it is considered that the content of the first compound containing Mn and the $CO_3$ moiety in the negative electrode mixture layer was too low. This is considered to be the reason why the SOC at the time of gas release of the nonaqueous electrolyte secondary battery of Comparative Example 1 was higher than those of the nonaqueous electrolyte secondary batteries of Examples 1 to 11. The same applies to Comparative Example 3 and Comparative Examples 6 and 7.

In the negative electrode of the nonaqueous electrolyte secondary battery of Comparative Example 2, the value of x was 0.22. In the nonaqueous electrolyte secondary battery of Comparative Example 2, it is considered that the content of the first compound containing Mn and the $CO_3$ moiety in the negative electrode mixture layer was too high. This is considered to be the reason why, as shown in Table 3, the nonaqueous electrolyte secondary battery of Comparative Example 2 exhibited a higher resistance value than those of the nonaqueous electrolyte secondary batteries of Examples 1 to 11 and the nonaqueous electrolyte secondary battery of Comparative Example 1.

In the negative electrode of the nonaqueous electrolyte secondary battery of Comparative Example 4, the value of x was 0.024, the value of y was 2.8, and the value of z was 0.42. In the negative electrode of the nonaqueous electrolyte secondary battery of Comparative Example 4, it is considered that the content of the first compound containing Mn and the $CO_3$ moiety in the negative electrode mixture layer was too low due to the above-described reason. This is considered to be the reason why, as shown in Table 3, the SOC at the time of gas release of the nonaqueous electrolyte secondary battery of Comparative Example 4 was about the same as that of Comparative Example 1.

On the other hand, in the nonaqueous electrolyte secondary battery of Comparative Example 5, which was produced by raising the aging temperature compared with that of Comparative Example 4, the value of y was 27, whereas the value of z was 0.41; thus, the value of z did not fall within the range from 0.5 to 5. In Comparative Example 5, since the value of z was about the same as that of Comparative Example 4, it is considered that the second compound containing the $CO_3$ moiety and the third compound containing the CO moiety and/or the fourth compound containing the $CO_2$ moiety were increased together due to decomposition of the mixed solvent. Accordingly, it is considered that the reason why the value of y of Comparative Example 5 was larger than that of Comparative Example 4 is not because of the increase in the amount of the first compound containing Mn and the $CO_3$ moiety, but is because of the increase in the amount of the second compound containing the $CO_3$ moiety due to decomposition of the mixed solvent. That is, the reason why the resistance value of the nonaqueous electrolyte secondary battery of Comparative Example 5 was high is because the second compound and the third compound and/or the fourth compound were excessively generated due to decomposition of the mixed solvent.

From the comparison of the results of Examples 1, 6 and 7, it can be seen that even if the positive electrode active material is different, in particular, regardless of whether the positive electrode active material contains Mn or not, the nonaqueous electrolyte secondary battery in which the ratios x, y, and z obtained according to X-ray photoelectron spectroscopy measurement on the negative electrode mixture layer are within the ranges of $0.01 \leq x \leq 0.2$; $3 \leq y \leq 50$; $0.5 \leq z \leq 5$, respectively, was able to exhibit low resistance value and excellent safety. Should be noted that lithium manganate represented by the composition formula $LiMn_2O_4$ can exhibit excellent stability at high temperature as described above. Therefore, among the nonaqueous electrolyte secondary batteries of Examples 1, 6 and 7, the nonaqueous electrolyte secondary battery of Example 1 can exhibit the most excellent safety.

From the comparison of the results of Examples 1 and 8 to 11, it can be seen that the nonaqueous electrolyte secondary battery of each of Examples 1, 8, 10 and 11 in which the nonaqueous solvent (mixed solvent) contained propylene carbonate was low in SOC at the time of gas release, and exhibited superior safety and low resistance, as compared with the nonaqueous electrolyte secondary battery of Example 9 with no propylene carbonate.

In addition, as is clear from the results shown in Table 1, in Examples 4 and 5 in which manganese carbonate was not used in producing the negative electrode, the ratios x, y and z obtained from the X-ray photoelectron spectroscopy spectrum of the negative electrode mixture layer were within the ranges of $0.01 \leq x \leq 0.2$; $3 \leq y \leq 50$; $0.5 \leq z \leq 5$, respectively. Again, when the ratios x, y and z are within the above ranges, the negative electrode mixture layer can include the first compound containing Mn and the $CO_3$ moiety.

In addition, as is clear from the results shown in Table 1, in the nonaqueous electrolyte secondary batteries of Examples 1 and 11, the ratios x, y and z obtained from the X-ray photoelectron spectroscopy spectrum of the negative electrode mixture layer were within the ranges of $0.02 \leq x \leq 0.1$; $15 \leq y \leq 30$; $1 \leq z \leq 2$, respectively. As described above, in these Examples 1 and 11, manganese carbonate was used as a negative electrode additive. As is apparent from the results shown in Table 3, in the nonaqueous electrolyte secondary batteries of Examples 1 and 11, the resistance value was about the same as that of Comparative Example 1, but the SOC at the time of gas release was even lower than those of the nonaqueous electrolyte secondary batteries of Examples 2 to 5 and Examples 8 to 10. That is, the nonaqueous electrolyte secondary batteries of Examples 1 and 11 were able to exhibit particularly excellent safety.

Example 12

In Example 12, a nonaqueous electrolyte secondary battery of Example 12 was produced by the same procedure as in Example 1 except for the following points.

In Example 12, the provided materials of the negative electrode were put into NMP and mixed in a manner that the mixing ratio of LTO powder:graphite:PVdF:manganese carbonate powder was 100:10:3:0.02 in weight ratio to thereby prepare a negative electrode slurry. In Example 12, the nonaqueous electrolyte similar to that used in Example 4 was used.

Comparative Example 8

In Comparative Example 8, a nonaqueous electrolyte secondary battery of Comparative Example 8 was produced by the same procedure as in Example 12 except that the aging temperature was set to 70° C.

Example 13

In Example 13, a nonaqueous electrolyte secondary battery for Example 13 was produced by the same procedure as in Example 3 except that the nonaqueous electrolyte similar to that used in Example 5 was used.

Example 14

In Example 14, a nonaqueous electrolyte secondary battery of Example 14 was produced by the same procedure as in Example 1 except that the aging temperature was set to 50° C.

Example 15

In Example 15, a nonaqueous electrolyte secondary battery of Example 15 was produced by the same procedure as in Example 1 except for the following points.

In Example 15, a negative electrode slurry was prepared by the same procedure as in Example 12. In Example 15, the aging temperature was set to 70° C.

Example 16

In Example 16, a nonaqueous electrolyte secondary battery of Example 16 was produced by the same procedure as in Example 4 except that the aging temperature was set to 70° C.

The analysis results of the negative electrode mixture layer of each of the nonaqueous electrolyte secondary batteries of Examples 12 to 16 and Comparative Example 8 are shown in Table 6 below. The analysis was performed by the X-ray photoelectron spectroscopy measurement according to the method described above. Table 7 below shows the items changed from those of Example 1 in Examples 12 to 16 and Comparative Example 8 among the conditions of production of the nonaqueous electrolyte secondary battery.

TABLE 6

|  | $R_{Mn}/R_{Ti}$ (x) | $R_A/R_{Mn}$ (y) | $R_A/R_B$ (z) |
|---|---|---|---|
| Example 12 | 0.011 | 42 | 1.83 |
| Comparative Example 8 | 0.011 | 55 | 2.39 |

TABLE 6-continued

|  | $R_{Mn}/R_{Ti}$ (x) | $R_A/R_{Mn}$ (y) | $R_A/R_B$ (z) |
| --- | --- | --- | --- |
| Example 13 | 0.025 | 7 | 0.52 |
| Example 14 | 0.196 | 7 | 0.95 |
| Example 15 | 0.098 | 6 | 1.17 |
| Example 16 | 0.022 | 16 | 1.39 |

TABLE 7

|  | Negative Electrode Additive/Added Amount*[1] | Electrolyte Additive/Added Amount | Aging Temperature | Composition of Positive Electrode Active Material | Composition of Mixed Solvent [Volume Ratio] |
| --- | --- | --- | --- | --- | --- |
| Example 12 | Manganese Carbonate/0.02 | Manganese Oxalate/0.1*[2] | 60° C. | $LiMn_2O_4$ | PC:EMC = 1:2 |
| Comparative Example 8 | Manganese Carbonate/0.02 | Manganese Oxalate/0.1*[2] | 70° C. | $LiMn_2O_4$ | PC:EMC = 1:2 |
| Example 13 | Manganese Carbonate/0.1 | LiBOB/1.0 wt %*[3] | 60° C. | $LiMn_2O_4$ | PC:EMC = 1:2 |
| Example 14 | Manganese Carbonate/0.03 | None | 50° C. | $LiMn_2O_4$ | PC:EMC = 1:2 |
| Example 15 | Manganese Carbonate/0.02 | None | 70° C. | $LiMn_2O_4$ | PC:EMC = 1:2 |
| Example 16 | None | Manganese Oxalate/0.1*[2] | 70° C. | $LiMn_2O_4$ | PC:EMC = 1:2 |

Annotations
*[1]Added amount of negative electrode additive is represented by weight ratio relative to 100 parts by weight of negative electrode active material.
*[2]Added amount of manganese oxalate is represented by weight ratio relative to 100 parts by weight of negative electrode active material.
*[3]Added amount of LiBOB is represented by wt % relative to total amount of nonaqueous electrolyte.

The nonaqueous electrolyte secondary batteries of Examples 12 to 16 and Comparative Example 8 were subjected to the resistance measurement and the over-charge test similar to those performed on the nonaqueous electrolyte secondary battery of Example 1. The results thereof are shown in Table 8 below.

TABLE 8

|  | SOC at the Time of Gas Release [Comparison to Comparative Example 1] | Resistance Value [Comparison to Comparative Example 1] |
| --- | --- | --- |
| Example 12 | 66 | 95 |
| Comparative Example 8 | 88 | 115 |
| Example 13 | 72 | 97 |
| Example 14 | 70 | 98 |
| Example 15 | 68 | 102 |
| Example 16 | 60 | 91 |

From the results shown in Table 6, it can be seen that in the nonaqueous electrolyte secondary batteries of Examples 12 to 16, the ratios x, y and z obtained from the X-ray photoelectron spectroscopy spectrum of the negative electrode mixture layer are within the ranges of 0.01≤x≤0.2; 3≤y≤50; 0.5≤z≤5, respectively.

Further, from the results shown in Tables 3 and 8, it can be seen that the nonaqueous electrolyte secondary batteries of Examples 12 to 16 were able to release the gas with lower SOC than the nonaqueous electrolyte secondary battery of Comparative Example 1, as with the nonaqueous electrolyte secondary batteries of Examples 1 to 5 and Examples 8 to 11. Moreover, it can be seen that the nonaqueous electrolyte secondary batteries of Examples 12 to 16 were able to exhibit the resistance values about the same as that of the nonaqueous electrolyte secondary battery of Comparative Example 1, as with the nonaqueous electrolyte secondary batteries of Examples 1 to 5 and Examples 8 to 11.

On the other hand, in the nonaqueous electrolyte secondary battery of Comparative Example 8, the value of the ratio y was 55. This result seems to indicate that in the nonaqueous electrolyte secondary battery of Comparative Example 8, the negative electrode mixture layer contained an excessive amount of the $CO_3$ moiety with respect to Mn, that is, the negative electrode mixture layer contained an excessive amount of the second compound containing the $CO_3$ moiety other than the first compound containing Mn and the $CO_3$ moiety. It is considered that, in the nonaqueous electrolyte secondary battery of Comparative Example 8, since the negative electrode mixture layer contained the second compound in an excessive amount as described above, the negative electrode exhibited the high resistance value, and as a result, the battery exhibited the high resistance value.

Further, as shown in Table 6, in the nonaqueous electrolyte secondary battery of Example 16, the ratios x, y and z obtained from the X-ray photoelectron spectroscopy spectrum of the negative electrode mixture layer were within the ranges 0.02≤x≤0.1; 15≤y≤30; 1≤z≤2, respectively. As is apparent from the results shown in Tables 3 and 6, in the nonaqueous electrolyte secondary battery of Example 16, the SOC at the time of gas release was even lower than those of the nonaqueous electrolyte secondary batteries of Examples 2 to 5 and Examples 8 to 10, as with each of nonaqueous electrolyte secondary batteries of Examples 1 and 11, and even lower than those of the nonaqueous electrolyte secondary batteries of Examples 12 to 15. Furthermore, the nonaqueous electrolyte secondary battery of Example 16 was able to exhibit the lower resistance value than those of the nonaqueous electrolyte secondary batteries of Examples 1 and 11.

That is, according to at least one embodiment and example, a nonaqueous electrolyte secondary battery can be provided. The nonaqueous electrolyte secondary battery includes a container member, a negative electrode, a positive electrode, and a nonaqueous electrolyte. The container member is provided with a gas relief structure. The container member accommodates the negative electrode, the positive electrode, and the nonaqueous electrolyte. The negative electrode includes a negative electrode mixture layer. The negative electrode mixture layer contains a titanium-containing oxide and Mn. Abundance ratios $R_{Ti}$, $R_{Mn}$, $R_A$ and $R_B$ obtained according to an X-ray photoelectron spectroscopy spectrum of the negative electrode mixture layer satisfy the following relational expressions: $0.01 \le R_{Mn}/R_{Ti} \le 0.2$ (1); $3 \le R_A/R_{Mn} \le 50$ (2); and $0.5 \le R_A/R_B \le 5$ (3). $R_{Ti}$ is an abundance ratio of Ti. $R_{Mn}$ is an abundance ratio of Mn. $R_A$ is an abundance ratio of C constituting the CO moiety. $R_B$ is a sum of an abundance ratio $R_C$ of C constituting the CO moiety and an abundance ratio $R_D$ of C constituting the $CO_2$ moiety. This nonaqueous electrolyte secondary battery can raise, while suppressing the increase in the resistance value, the gas pressure inside the battery, that is, in the space surrounded by the container member, in a state-of-charge lower than a state-of-charge that leads to rupture. As a result, the nonaqueous electrolyte secondary battery can exhibit low resistance and can exhibit excellent safety.

While certain embodiments of the present invention have been described, these embodiments have been presented by way of example only, and are not intended to limit the scope of the invention. The novel embodiments may be embodied in a variety of other forms, and various omissions, substitutions and changes may be made without departing from the spirit of the invention. The accompanying claims and their equivalents are intended to cover such forms or modifications as would fall within the scope and spirit of the invention.

What is claimed is:

1. A nonaqueous electrolyte secondary battery, comprising:
   a container member comprising a gas relief structure;
   a negative electrode accommodated in the container member and comprising a negative electrode mixture layer, the negative electrode mixture layer comprising a titanium-containing oxide and Mn;
   a positive electrode accommodated in the container member; and
   a nonaqueous electrolyte accommodated in the container member,
   wherein an X-ray photoelectron spectroscopy spectrum obtained by X-ray photoelectron spectroscopy measurement of the negative electrode mixture layer includes: a peak belonging to Ti; a peak belonging to Mn; a peak belonging to C constituting a $CO_3$ moiety; and a peak belonging to C constituting a $CO_2$ moiety and/or a peak belonging to C constituting a CO moiety, and
   wherein abundance ratios $R_{Ti}$, $R_{Mn}$, $R_A$ and $R_B$ obtained from the X-ray photoelectron spectroscopy spectrum satisfy the following relational expressions:

$$0.01 \le R_{Mn}/R_{Ti} \le 0.2 \quad (1);$$

$$3 \le R_A/R_{Mn} \le 50 \quad (2); \text{ and}$$

$$0.5 \le R_A/R_B \le 5 \quad (3),$$

where $R_{Ti}$ is an abundance ratio of Ti, $R_{Mn}$ is an abundance ratio of Mn, and $R_A$ is an abundance ratio of C constituting the $CO_3$ moiety, and
   $R_B$ is a sum of an abundance ratio $R_C$ of C constituting the CO moiety and an abundance ratio $R_D$ of C constituting the $CO_2$ moiety.

2. The nonaqueous electrolyte secondary battery according to claim 1, wherein the titanium-containing oxide comprises lithium titanate having a spinel-type crystal structure.

3. The nonaqueous electrolyte secondary battery according to claim 1, wherein the abundance ratios $R_{Ti}$, $R_{Mn}$, $R_A$ and $R_B$ fall within the following ranges:

$$0.02 \le R_{Mn}/R_{Ti} \le 0.1;$$

$$15 \le R_A/R_{Mn} \le 30; \text{ and}$$

$$1 \le R_A/R_B \le 2.$$

4. The nonaqueous electrolyte secondary battery according to claim 1, wherein the nonaqueous electrolyte comprises propylene carbonate.

5. The nonaqueous electrolyte secondary battery according to claim 1, wherein
   the container member is a metallic container, and
   the metallic container is provided with a gas relief vent as the gas relief structure.

6. The nonaqueous electrolyte secondary battery according to claim 1, wherein
   the container member includes a baggy container made of a laminate film, and
   the baggy container comprises:
     a heat-seal portion that is located at at least a part of a peripheral edge of the baggy container, and seals a space for accommodating the positive electrode, the negative electrode, and the nonaqueous electrolyte; and
     a gas relief vent that is a part of the heat-sealed portion and has heat sealability lower than other parts.

* * * * *